US011783555B2

(12) United States Patent
Tran

(10) Patent No.: US 11,783,555 B2
(45) Date of Patent: Oct. 10, 2023

(54) SYSTEM AND METHOD FOR TRANSFERRING CONTENT FROM ONE VIRTUAL ENVIRONMENT TO ANOTHER

(71) Applicant: PEER INC, Bellevue, WA (US)

(72) Inventor: Thinh Tran, Bellevue, WA (US)

(73) Assignee: PEER INC, Bellevue, WA (US)

( * ) Notice: Subject to any disclaimer, the term of this patent is extended or adjusted under 35 U.S.C. 154(b) by 0 days.

(21) Appl. No.: 17/985,775

(22) Filed: Nov. 11, 2022

(65) Prior Publication Data

US 2023/0154117 A1 May 18, 2023

Related U.S. Application Data

(60) Provisional application No. 63/280,059, filed on Nov. 16, 2021.

(51) Int. Cl.
*G06T 19/00* (2011.01)
*G06F 3/04845* (2022.01)
*G06F 3/04815* (2022.01)

(52) U.S. Cl.
CPC ........ *G06T 19/006* (2013.01); *G06F 3/04815* (2013.01); *G06F 3/04845* (2013.01)

(58) Field of Classification Search
CPC .................................................. G06T 19/006
See application file for complete search history.

(56) References Cited

U.S. PATENT DOCUMENTS

| 10,747,414 | B2 | 8/2020 | Tran | |
|---|---|---|---|---|
| 2010/0185984 | A1 | 7/2010 | Wright et al. | |
| 2013/0178257 | A1* | 7/2013 | Langseth | A63F 13/23 345/419 |
| 2017/0069134 | A1* | 3/2017 | Shapira | G06F 3/011 |
| 2017/0309051 | A1* | 10/2017 | Yamasaki | G06V 40/161 |
| 2018/0091869 | A1* | 3/2018 | Krishna | G06T 19/006 |
| 2019/0005717 | A1 | 1/2019 | Singh et al. | |
| 2020/0110560 | A1* | 4/2020 | Hariton | G06F 3/1206 |
| 2020/0183567 | A1* | 6/2020 | Gullicksen | G06F 3/011 |
| 2020/0249819 | A1 | 8/2020 | Berquam et al. | |
| 2022/0084279 | A1* | 3/2022 | Lindmeier | G06T 19/20 |
| 2022/0100279 | A1* | 3/2022 | Lee | G06T 19/20 |

* cited by examiner

*Primary Examiner* — Charles Tseng
(74) *Attorney, Agent, or Firm* — SEED INTELLECTUAL PROPERTY LAW GROUP LLP

(57) ABSTRACT

A multi-dimensional fabric user interface is described herein. A remote server executes an operating system that provides a multi-dimensional fabric user interface for storing content for a particular user. The user can access content by manipulating the multi-dimensional fabric user interface through a graphical user interface displayed on a personal mobile computing device. The remote server also enables the user to enter a portal and travel to a virtual representation a second actual physical location from a virtual representation of a first actual physical location, and transfer an object or content from the virtual representation of the first actual physical location to the virtual representation of the second actual physical location. This initiates an operation relating to the one or more of objects and content, in response to the user picking up, transferring, and placing the one or more of objects and content.

21 Claims, 19 Drawing Sheets

SYSTEM AND METHOD FOR TRANSFERRING CONTENT FROM ONE VIRTUAL ENVIRONMENT TO ANOTHER

TECHNICAL FIELD

The present application pertains to augmented reality virtual environments, and more particularly, to augmented reality virtual environments that enable the transfer of content between virtual environments.

BACKGROUND

Description of the Related Art

Operating systems have changed little over the past few decades. Early operating systems were command driven, where a user specified a particular file location to access data. These operating systems morphed into the icon-based interfaces used today. Icon-based operating systems display graphical representations, or icons, of files or data. Icons are associated with a particular file location, such that interaction with an icon by a user results in the corresponding file location being accessed. Accordingly, historical operating systems have been structured around using the file's location within the memory to access data, which limits the flexibility of using alternative storage structures.

Additionally, there is a continuing desire to virtually visit actual physical locations that exist in the real world for a variety of purposes. This may be as basic as using a mapping software application. However, traditional mapping software is very limited in the information that it conveys and the user experience that it provides.

Furthermore, there is a continuing desire to improve methods of accessing objects and content within augmented reality virtual environments. The present disclosure address this and other needs.

BRIEF SUMMARY

Briefly stated, embodiments of the present disclosure are directed towards an augmented reality system for enabling enhanced functionality in a virtual environment using a multi-dimensional fabric that facilitates the transfer of content between virtual environments by a user. The multi-dimensional fabric stores content using time and location coordinates, which can be accessed in the virtual environment. The augmented reality system enables the user to access a portal in the virtual representation of the first actual physical location that facilitates the transfer of objects and content to a virtual representation of a second actual physical location in the multi-dimensional fabric user interface.

The remote server includes a server memory that stores server computer instructions and a server processor that, when executing the server computer instructions, causes the remote server to: manipulate a multi-dimensional fabric user interface for a user based on received input from the user via an associated personal mobile computing device; enable the user to enter a first location side of a portal and travel to a virtual representation of a second actual physical location from a virtual representation of a first actual physical location; while in the multi-dimensional fabric user interface that virtually represents the second actual physical location, enable the user to pick up one or more of objects and content from the virtual representation of the second actual physical location; enable the user to enter the second location side of the portal on the personal mobile device from the virtual representation of the second actual physical location and travel to the virtual representation of the first actual physical location with the one or more of objects and content that the user picked up in the virtual representation of the second actual physical location; enable the user to place the one or more of objects and content at a specific location in the virtual representation of the first actual physical location; and initiate an operation relating to the one or more of objects and content, in response to the user picking up, transferring, and placing the one or more of objects and content at the specific location in the virtual representation of the first actual physical location.

In some embodiments of the augmented reality system, the one or more of objects and content picked up, transferred and placed by the user represent an actual object in the physical world. In other embodiments, the one or more of objects and content picked up, transferred and placed by the user represent an actual service in the physical world. In another aspect of some embodiments, the remote server, when executing the server computer instructions, further causes the remote server to: enable the user to look through the first location side of the portal on the personal mobile device and interact with the one or more of the objects and content in the virtual representation of the second actual physical location from the virtual representation of the first actual physical location. In another aspect of some embodiments, the remote server, when executing the server computer instructions, further causes the remote server to: enable the user to look through the first location side of the portal on the personal mobile device and transfer the one or more of the objects and content from the virtual representation of the second actual physical location to the virtual representation of the first actual physical location.

In one or more embodiments of the augmented reality system, the operation initiated by the user relating to the one or more of objects and content is a purchase of the one or more of objects and content. In another aspect of some embodiments, the operation initiated by the user relating to the one or more of objects and content is reserving temporary usage of the one or more of objects and content. In still another aspect of some embodiments, the operation initiated by the user relating to the one or more of objects and content is one or more of uploading data and downloading data related to purchasing a product or service. In yet another aspect of some embodiments, the user picking up, transferring, and placing the one or more of objects and content at the specific location in the virtual representation of the first actual physical location creates a link for one or more of future information transfer and future purchases. In another aspect of some embodiments, the manipulation of the multi-dimensional fabric user interface based on the received input from the user includes one or more of (1) moving anchored digital content from a first location to a second location in the multi-dimensional fabric user interface and (2) moving anchored digital content from a location to a user in the multi-dimensional fabric user interface.

In one or more embodiments, an augmented reality remote server system is disclosed that enables enhanced functionality in a virtual environment. Such a system includes a server processor; a server memory that stores server computer instructions, the server processor, when executing the server computer instructions, causing the remote server to: manipulate and display a multi-dimensional fabric user interface based on received input from a user via an associated personal mobile computing device; enable a user to travel to a virtual representation of a second actual physical location in the multi-dimensional fabric user interface from the virtual representation of the first actual physical location in the multi-dimensional fabric user interface; while in the multi-dimensional fabric user interface that virtually represents the second actual physical location, enable the user to pick up one or more of objects and content from the virtual representation of the second actual physical location; enable the user to travel to the virtual representation of the first actual physical location with the one or more of objects and content that the user picked up in the virtual representation of the second actual physical location; enable the user to place the one or more of objects and content at a specific location in the virtual representation of the first actual physical location; and initiate an operation relating to the one or more of objects and content, in response to the user picking up, transferring, and placing the one or more of objects and content at the specific location in the virtual representation of the first actual physical location.

In another aspect of some embodiments, the one or more of objects and content picked up, transferred, and placed by the user represent one or more of an actual object in the physical world or an actual service in the physical world.

In some embodiments, an augmented reality method is disclosed for enabling enhanced functionality in an environment. The method includes: providing a multi-dimensional fabric user interface to a personal mobile computing device that is a virtual representation of a first actual physical location; manipulating the multi-dimensional fabric user interface based on received input from the user via the associated personal mobile computing devices; enabling a user to enter a first location side of a portal and travel to a virtual representation of a second actual physical location in the multi-dimensional fabric user interface from the virtual representation of the first actual physical location in the multi-dimensional fabric user interface; while in the multi-dimensional fabric user interface that virtually represents the second actual physical location, enabling the user to pick up one or more of objects and content from the virtual representation of the second actual physical location; enabling the user to enter a second location side of the portal on the personal mobile device from the virtual representation of the second actual physical location and travel to the virtual representation of the first actual physical location with the one or more of objects and content that the user picked up in the virtual representation of the second actual physical location; enabling the user to place the one or more of objects and content at a specific location in the virtual representation of the first actual physical location; and initiating an operation relating to the one or more of objects and content, in response to the user picking up, transferring, and placing the one or more of objects and content at the specific location in the virtual representation of the first actual physical location.

In another aspect of some embodiments, the one or more of objects and content picked up, transferred, and placed by the user represent one or more of an actual object in the physical world or an actual service in the physical world. In still another aspect of some embodiments, the remote server, when executing the server computer instructions, further causes the remote server to: enable the user to look through the first location side of the portal on the personal mobile device and transfer the one or more of the objects and content from the virtual representation of the second actual physical location to the virtual representation of the first actual physical location. In yet another aspect of some embodiments, the operation initiated by the user relating to the one or more of objects and content is a purchase of the one or more of objects and content. Furthermore, in other embodiments, the operation initiated by the user relating to the one or more of objects and content is reserving temporary usage of the one or more of objects and content. In still another aspect of some embodiments, the manipulation of the multi-dimensional fabric user interface based on the received input from the user includes moving anchored digital content from a first location to a second location in the multi-dimensional fabric user interface.

In other embodiments, an augmented reality remote server system is disclosed for enabling enhanced functionality in a virtual environment. The system including: a server processor; a server memory that stores server computer instructions, the server processor, when executing the server computer instructions, causing the remote server to: access a multi-dimensional fabric user interface to a personal mobile computing device that displays a virtual representation of a first actual physical location at a first date and time; manipulate and display the multi-dimensional fabric user interface based on received input from the user via the associated personal mobile computing devices; enable the user to travel to a virtual representation of a second actual physical location at a second date and time in the multi-dimensional fabric user interface from the virtual representation of the first actual physical location at the first date and time; while in the multi-dimensional fabric user interface that virtually represents the second actual physical location, enable the user to pick up one or more of objects and content from the virtual representation of the second actual physical location at the second date and time; enable the user to travel to the virtual representation of the first actual physical location at the first date and time with the one or more of objects and content that the user picked up in the virtual representation of the second actual physical location at the second date and time; enable the user to place the one or more of objects and content at a specific location in the virtual representation of the first actual physical location at the first date and time; and initiate an operation relating to the one or more of objects and content, in response to the user picking up, transferring, and placing the one or more of objects and content at the specific location in the virtual representation of the first actual physical location at the first date and time.

The embodiments described in the present disclosure improve upon known data storage architectures, structures, processes, and techniques in a variety of different computerized technologies, such as operating systems, user interfaces, and social networks.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, and the like. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
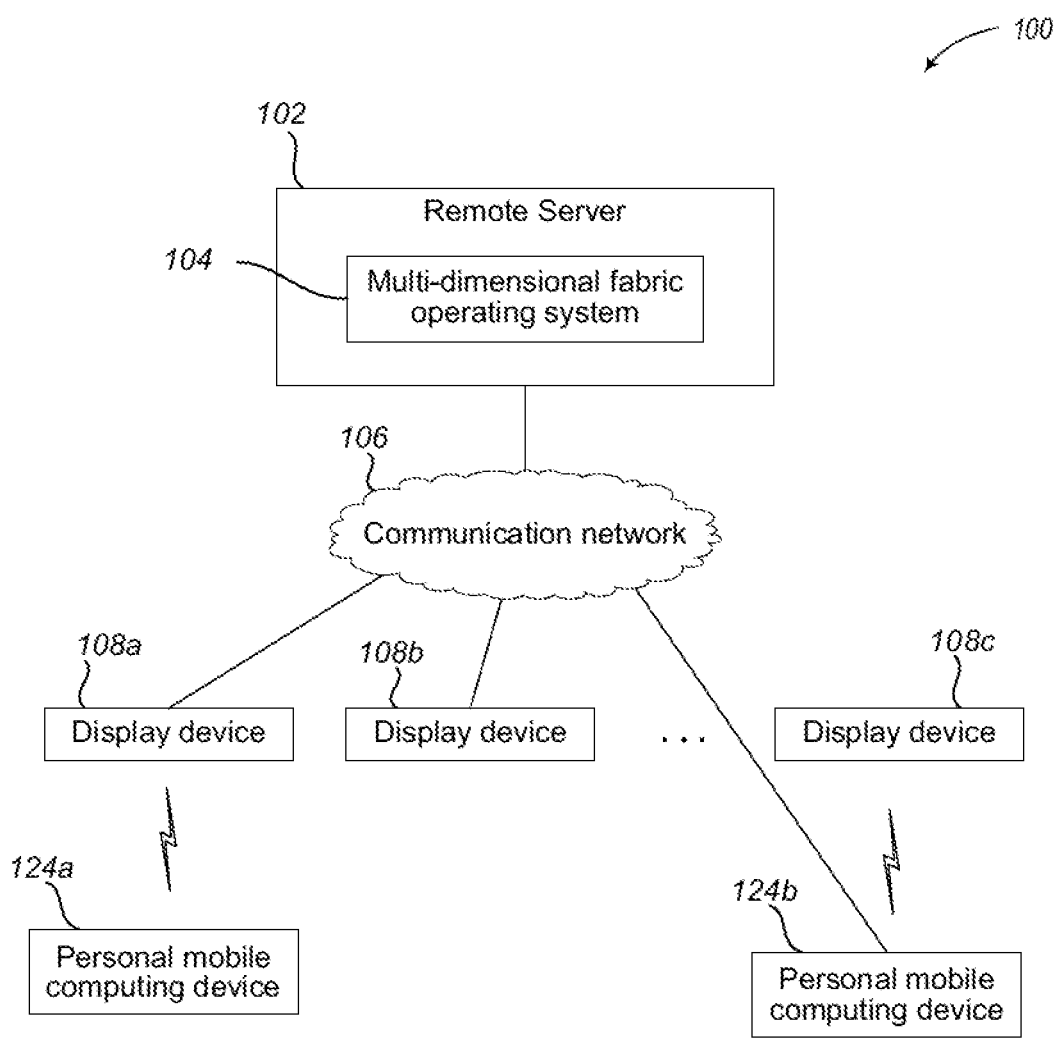
FIG. 1 illustrates a context diagram of an environment that provides a multi-dimensional fabric user interface for storing content in accordance with embodiments described herein.

FIG. 1 illustrates a context diagram of an augmented reality system for transferring objects and content between virtual environments in which an environment 100 provides a multi-dimensional fabric user interface for storing content in accordance with embodiments described herein. In the illustrated example, environment 100 includes a remote server 102, one or more display devices 108a-108c, and one or more personal mobile computing devices.

The remote server 102 in the augmented reality system for transferring objects and content between virtual environments 100 is configured as a remote computing system, e.g., cloud computing resources, which implements or executes operation of a multi-dimensional fabric operating system 104. In various embodiments, a separate instance of the multi-dimensional fabric operating system 104 is maintained and executed for each separate personal mobile computing device 124a, 124b. In some embodiments, the multi-dimensional fabric user interface may be implemented as an operating shell.

Although not illustrated, the remote server 102 may also be running various programs that are accessible to the users of the personal mobile computing devices 124a, 124b via the multi-dimensional fabric operating system 104. Accordingly, the environment and system described herein make it possible for a plurality of applications to be run in the cloud, and a user accesses a particular application by moving the fabric to that application's coordinates.

Figure 5:
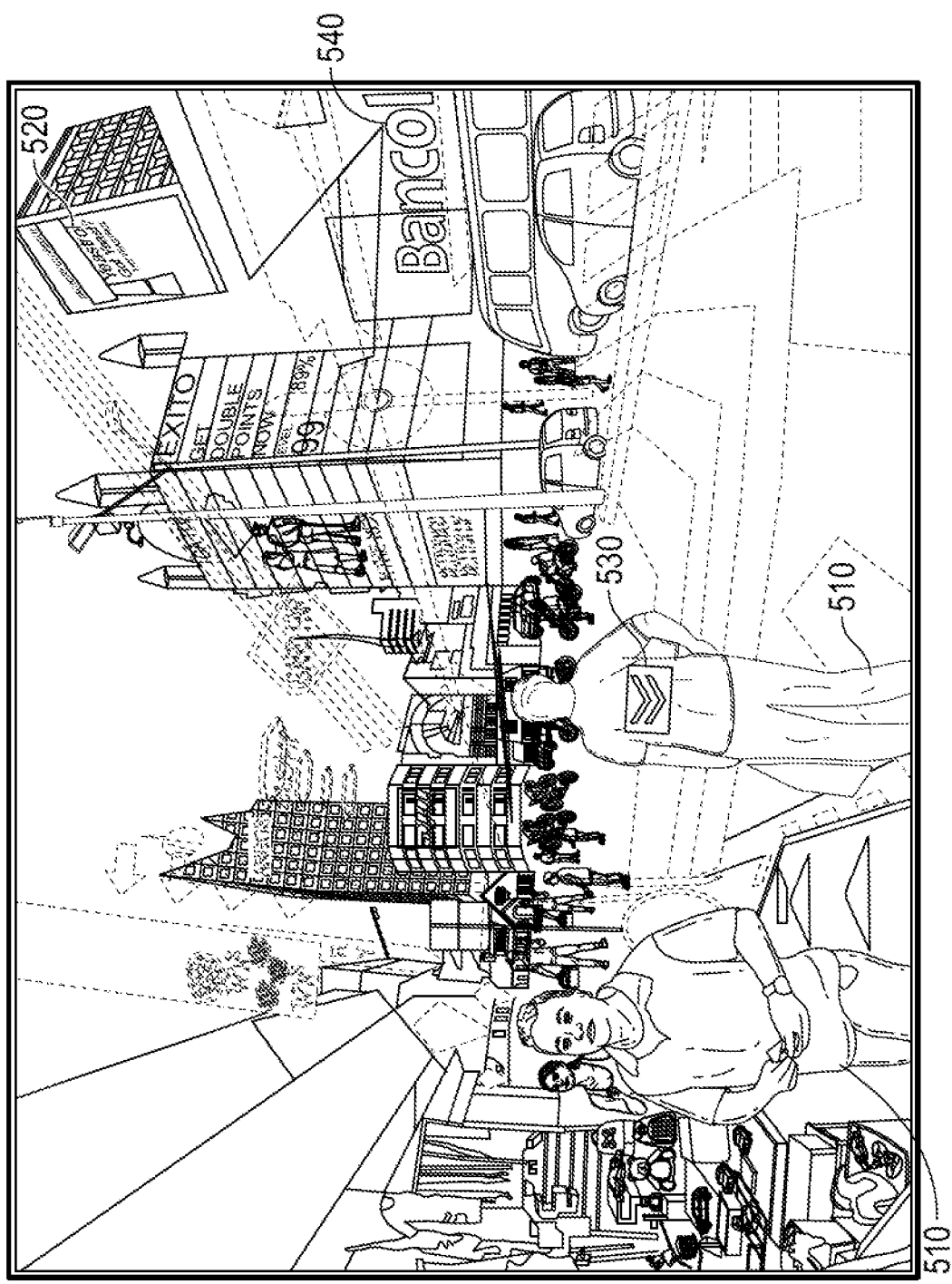
FIG. 5 illustrates a multi-dimensional fabric user interface at a first time that is accessed from disparate virtual and physical spaces via multiple users each having a processor-based device, in which store fronts are viewable but no advertisements are viewable.
Figure 6:
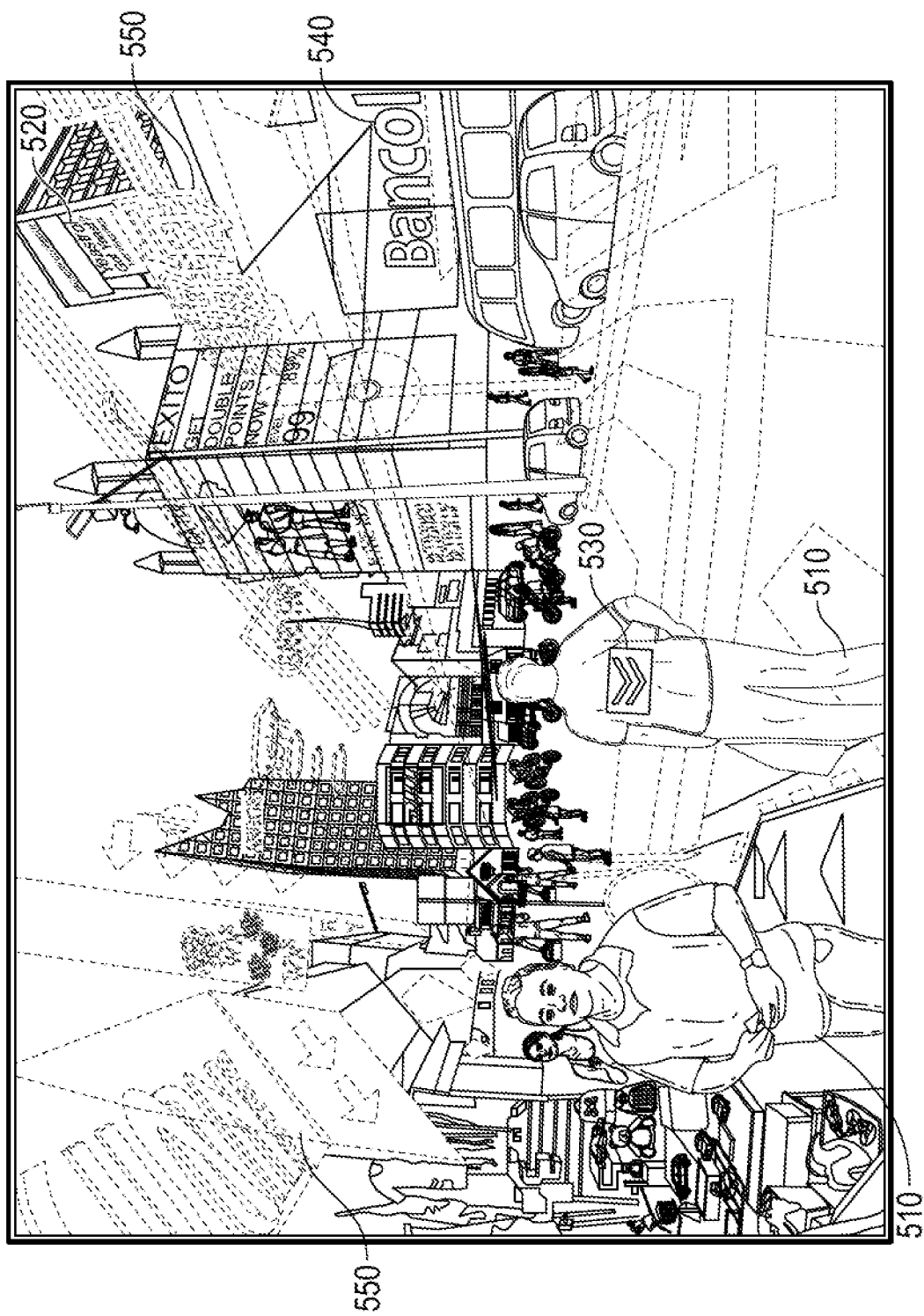
FIG. 6 illustrates a multi-dimensional fabric user interface at a second time that is accessed from disparate virtual and physical spaces via multiple users each having a processor-based device, in which store fronts are viewable and a first group of advertisements are viewable.
Figure 7:
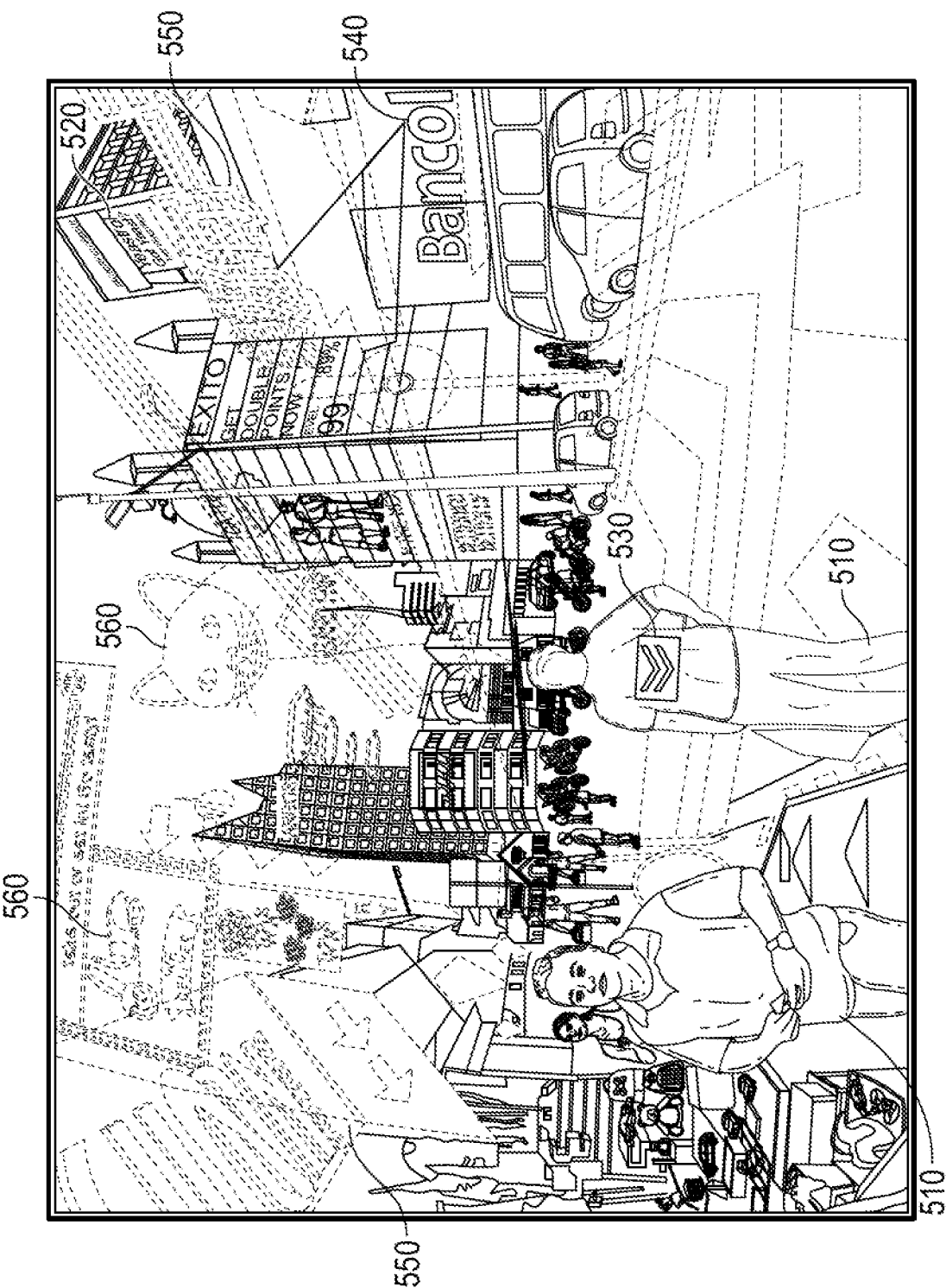
FIG. 7 illustrates a multi-dimensional fabric user interface at a third time that is accessed from disparate virtual and physical spaces via multiple users each having a processor-based device, in which store fronts are viewable and a first and second group of advertisements are viewable.

Throughout the description and figures the term "user" is used to refer both to the actual user that is initiating actions with the mobile device, and also to the avatar of the user that is shown in FIGS. 5-7 on the screen of a mobile device. The user is sometimes referred to with the reference number 510, as shown in FIGS. 5-7, and is sometimes referred to as reference number 1150, as shown in FIGS. 8A, 9, 10, 11, 12A, 12B, 13, 14, and 15. In some implementations, first-person views may be used in which the user is not viewable in the figures.

The multi-dimensional fabric operating system 104 in the augmented reality system for transferring objects and content between virtual environments 100 stores content according to a plurality of different dimensions. In some embodiments, the content is stored based on when the content was captured by the user or when it was stored by the remote server 102 (e.g., a time stamp added to a picture when the picture was captured or a time stamp when the picture was uploaded to the remote server), where the content was captured by the user (e.g., the location of the camera that captured the picture or a location of a display device used to upload the picture from the camera to the remote server), and what the content is about (e.g., food, clothing, entertainment, transportation, etc.).

A user in the augmented reality system for transferring objects and content between virtual environments 100 can access the multi-dimensional fabric operating system 104 via a display device 108a. The user has a personal mobile computing device 124, which can create or obtain content. The user can walk up to or approach a display device 108. The display device 108 coordinates authentication of the personal mobile computing device 124 with the remote server 102. The user can then use the display device 108 as a personal computer to upload content from the personal mobile computing device 124 to the remote server 102 using the multi-dimensional fabric operating system 104. Similarly, the user can use the display device 108 to access content previously stored by the multi-dimensional fabric operating system 104. For example, the user can use hand gestures, or touch interfaces, to provide input that manipulates a user interface displayed on the display device 108, where the user interface is generated by the multi-dimensional fabric operating system 104. The remote server 102 can respond to the input by providing an updated user interface of the multi-dimensional fabric to the display device 108 for display to the user. Notably, the user may transmit between the personal mobile computing device 124b and the remote server 102 via the communication network 106, without connecting to a display device 108 in some embodiments.

The user can also use the display device 108 as a personal computer to move content from one location to another location in the multi-dimensional fabric operating system 104. The augmented reality system for transferring objects and content between virtual environments 100 enables the user to travel from a virtual representation of a first actual physical location to a virtual representation of a second actual physical location. While in the multi-dimensional fabric user interface that virtually represents the second actual physical location, the augmented reality system 100 enables the user to pick up one or more of objects and content from the virtual representation of the second actual physical location and travel back to the virtual representation of the first actual physical location with the one or more of objects and content that the user picked up. Additionally, the augmented reality system 100 enables the user to place the one or more of objects and content at a specific location in the virtual representation of the first actual physical location, which initiates an operation (i.e., execution of instructions by a processor in the system) related to the objects or content.

Figure 2:
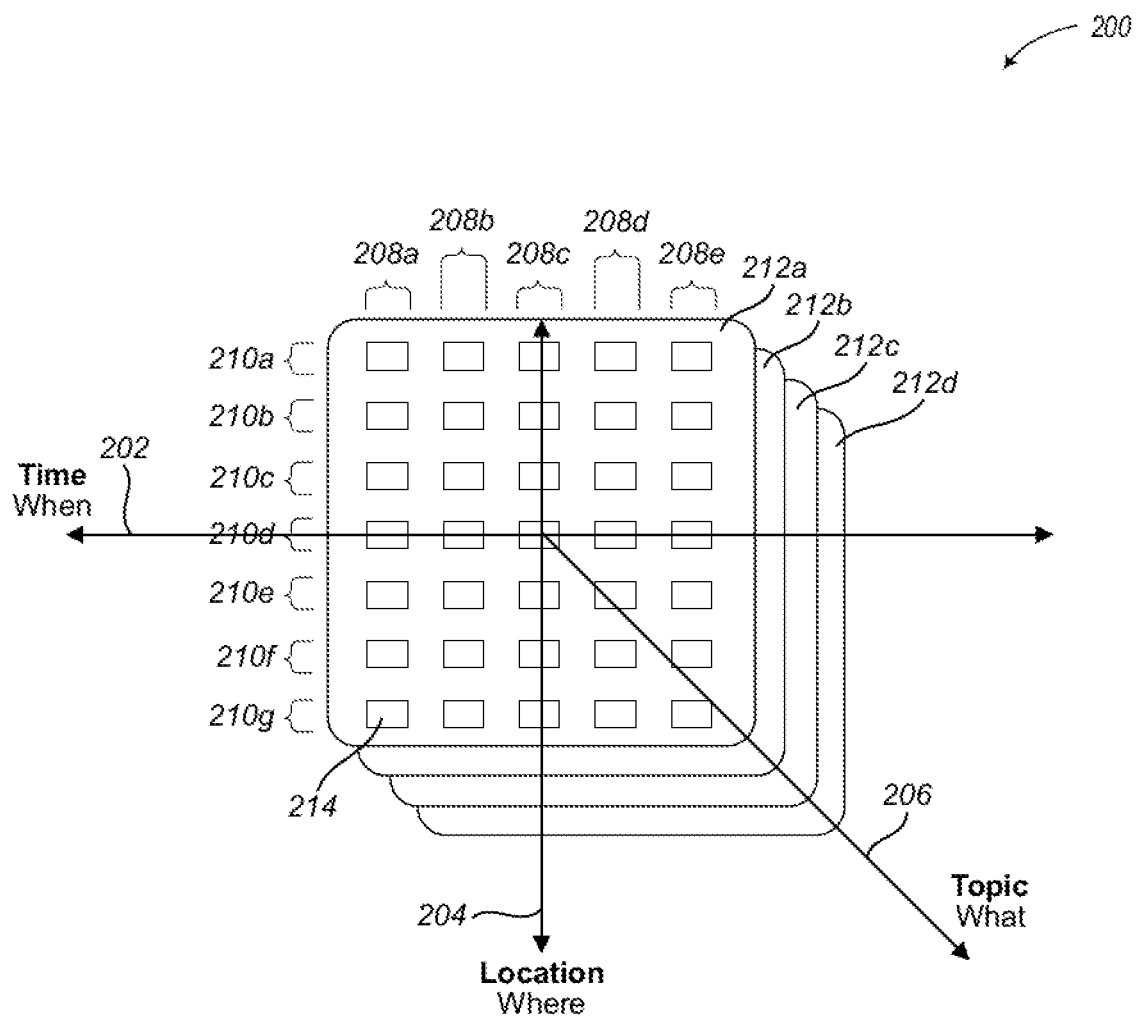
FIG. 2 illustrates a graphical representation of a multi-dimensional fabric user interface for storing content in accordance with embodiments described herein.
Figure 3:
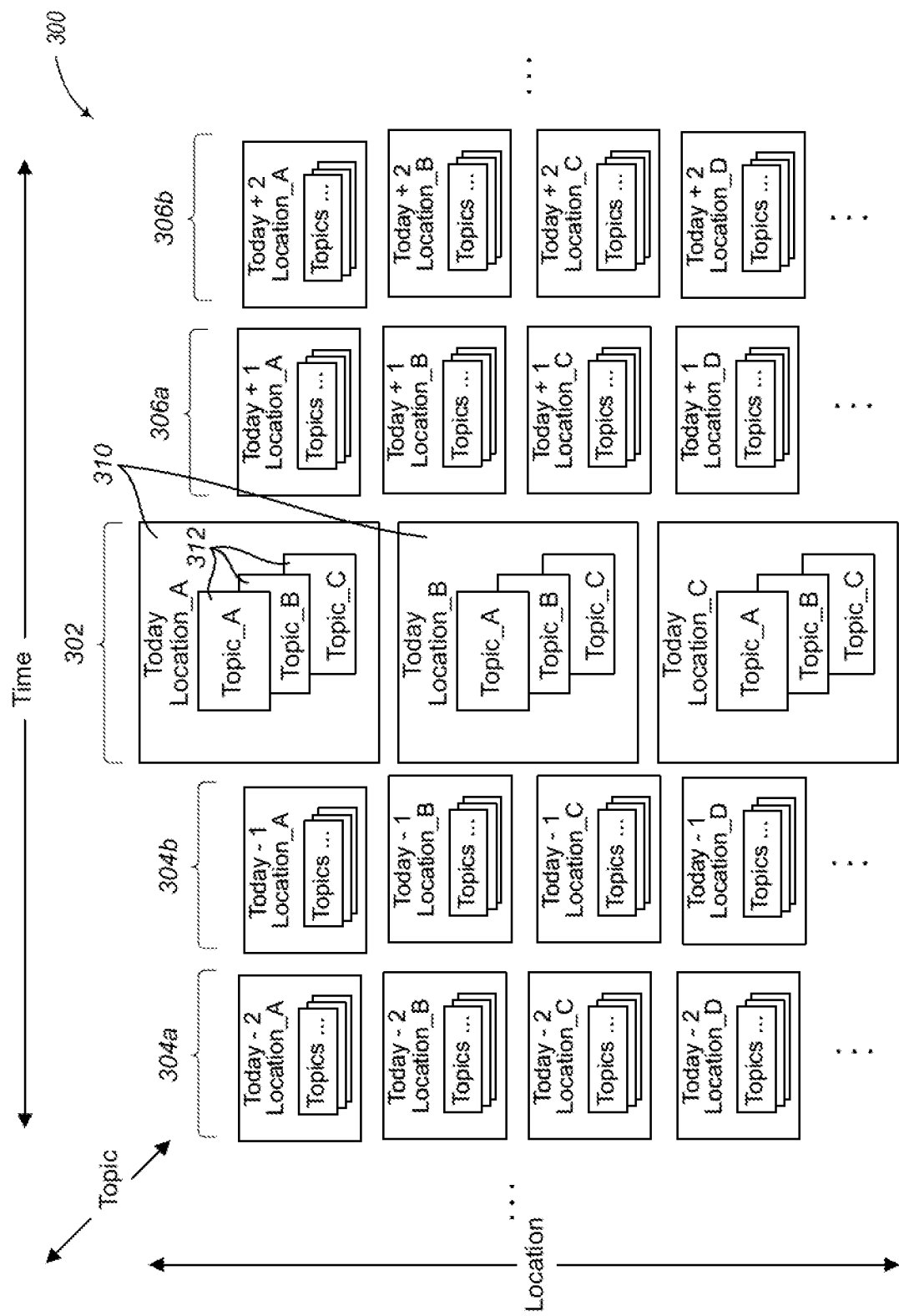
FIG. 3 illustrates another graphical representation of a multi-dimensional fabric user interface for storing content in accordance with embodiments described herein.

FIGS. 2 and 3 illustrate graphical representations of use case examples of a multi-dimensional fabric user interface for storing content in an augmented reality system for transferring objects and content between virtual environments 100 described herein.

Example fabric 200 in FIG. 2 includes a time axis 202, a location axis 204, and a topic axis 206. Although fabric 200 appears to be constrained in each axis, embodiments are not so limited. Rather, fabric or graphical environment is flexible, while the coordinate is fixed. This allows a user to use cruder movements, like the swipe of an arm, to achieve refined movement to arrive at the content. This also reduces the content footprint because it does not need to manage a file structure, which improves throughput to a degree that it can run entirely in the cloud.

In some embodiments, users in the multi-dimensional fabric system navigate by moving the environment, or fabric, to a specific content or item. The content is placed within a 3-Dimensional structure of Time (when)+Location (where)+Topic (what), which may be in the form of a multi-dimensional coordinate system. By configuring the content in the fabric based on three dimensions (What, When, Where), the fabric provides a pre-configured scaffold that allows a user to navigate the plurality of content without the multi-dimensional fabric system fetching and organizing it. The fabric makes the discovery more relevant content immediately accessible.

The time axis 202 in the multi-dimensional fabric system may be arranged as a plurality of different time periods, such as hours or days. In various embodiments, the current time period (e.g., today) is shown in the middle column 208c, which is shown in FIG. 3. The location axis 204 may be arranged as a plurality of different locations. In some embodiments, the content locations are selected based on a distance from a current location of the display device that is accessing the fabric 200. For example, locations closest to the display device are arranged in the top column 210a and the locations furthest from the display device are arrange in the bottom column 210g. Likewise, topics may be arranged based on themes or nearest to the display device. For example, food content may be in layer 212a, entertainment content in layer 212b, transportation content in layer 212c, etc. In other embodiments, the topics may be arranged based on frequency of access to the user based on location.

The fabric 200 in the multi-dimensional fabric system illustrates a plurality of icons 214 that each represent separate content (also referred to as content 214). The content 214 is laid out in a plurality of time periods 208a-208e (columns), a plurality of locations 210a-210g (rows), and a plurality of topics 212a-212d (layers), using coordinates associated with the separate dimensions. For any given point defined by (What, When, Where) there is a finite amount of content or data. As a result, users can simply point out a certain What, When, and Where to know where something is located and can directly access it from that point.

In some embodiments of the augmented reality system for transferring objects and content between virtual environments 100, location rows 210, time columns 208, and topic layers may be independent from one another such that a user can manipulate a single axis. In other embodiments, the user can manipulate two or more axes. For example, a user can vertically scroll along the location axis 204 through a single column (e.g., single time period on the time axis), such as column 208c, without affecting the other columns or layers, or the user can vertically scroll along the location axis 204 for multiple columns or multiple layers, or both. Likewise, the user can horizontally scroll along the time axis 202 through a single row (e.g., single location on the location axis), such as row 210d, without affecting the other rows or layers, or the user can horizontally scroll along the time axis 202 for multiple rows or multiple layers, or both. Moreover, the user can depth scroll along the topic axis 206 through a single layer (e.g., single topic on the topic axis), such as layer 212a, without affecting the other rows or columns, or the user can depth scroll along the topic axis 206 for multiple rows or multiple columns, or both.

By providing input to one or more axes in the augmented reality system for transferring objects and content between virtual environments 100, the user can manipulate or move the fabric 200 to access content for a specific time, a specific location, and a specific topic. The user can scroll on a particular axis by providing one or more hand gestures. For example, a horizontal movement of the user's arm may move the time axis 202, a vertical movement of the user's arm may move the location axis 204, and an in-or-out movement of the user's arm may move the topic axis 206. The user can then select a specific content 214, such as the content in the middle (along time and location axes) and on top (along the topic axis) of the fabric by moving their arm away from the display screen or by making a fist or by opening their hand.

In some embodiments of the augmented reality system for transferring objects and content between virtual environments 100, the fabric will look two dimensional to a user, but is actually three dimensional, such that when a two-dimensional point is selected by the user, the user can switch axes to view the third dimension. Although FIG. 2 shows the time axis 202 and the location axis 204 on this top-level two-dimensional view, other combinations of axes may also be used, e.g., time v. topic, location v. topic, or other non-illustrated axes.

Example fabric 300 in FIG. 3 is similar to fabric 200 in FIG. 2, but is an example of how the fabric 300 can be displayable to a user outside of a common virtual space. Examples of using a multi-dimensional fabric within a common virtual space are shown in FIGS. 5-7.

In this example illustration in FIG. 3, the current time period 302 is illustrated in a middle column with future time periods 306a, 306b to the right of the current time period 302 and past time periods 304a, 304b to the left of the current time period. Each location 310 in the current time period 302 includes a plurality of topics 312. These topics 312 are similar to the layers 212 in FIG. 2.

Again, the user in the multi-dimensional fabric system can move or manipulate the fabric 300 along one or more axes to select a particular piece of content. Once selected, the particular content is displayed to the user. Various embodiments, of the multi-dimensional fabric described herein can be used for a variety of different content storage technologies. One example technology is the fluid timeline social network described in U.S. patent application Ser. No. 16/300,028, filed Nov. 8, 2018, titled FLUID TIMELINE SOCIAL NETWORK, and issued Aug. 18, 2020, as U.S. Pat. No. 10,747,414, which is incorporated herein by reference.

The operation of certain aspects of the disclosure will now be described with respect to FIGS. 4A and 4B. In at least one of various embodiments of the augmented reality system for transferring objects and content between virtual environments 100, process 400 described in conjunction with FIG. 4A may be implemented by or executed by operations on a system of one or more computing devices, such as display device 108 in FIG. 1, and process 500 described in conjunction with FIG. 4B may be implemented by or executed by operations on a system of one or more remote computing devices, remote server 102.

Figure 4A:
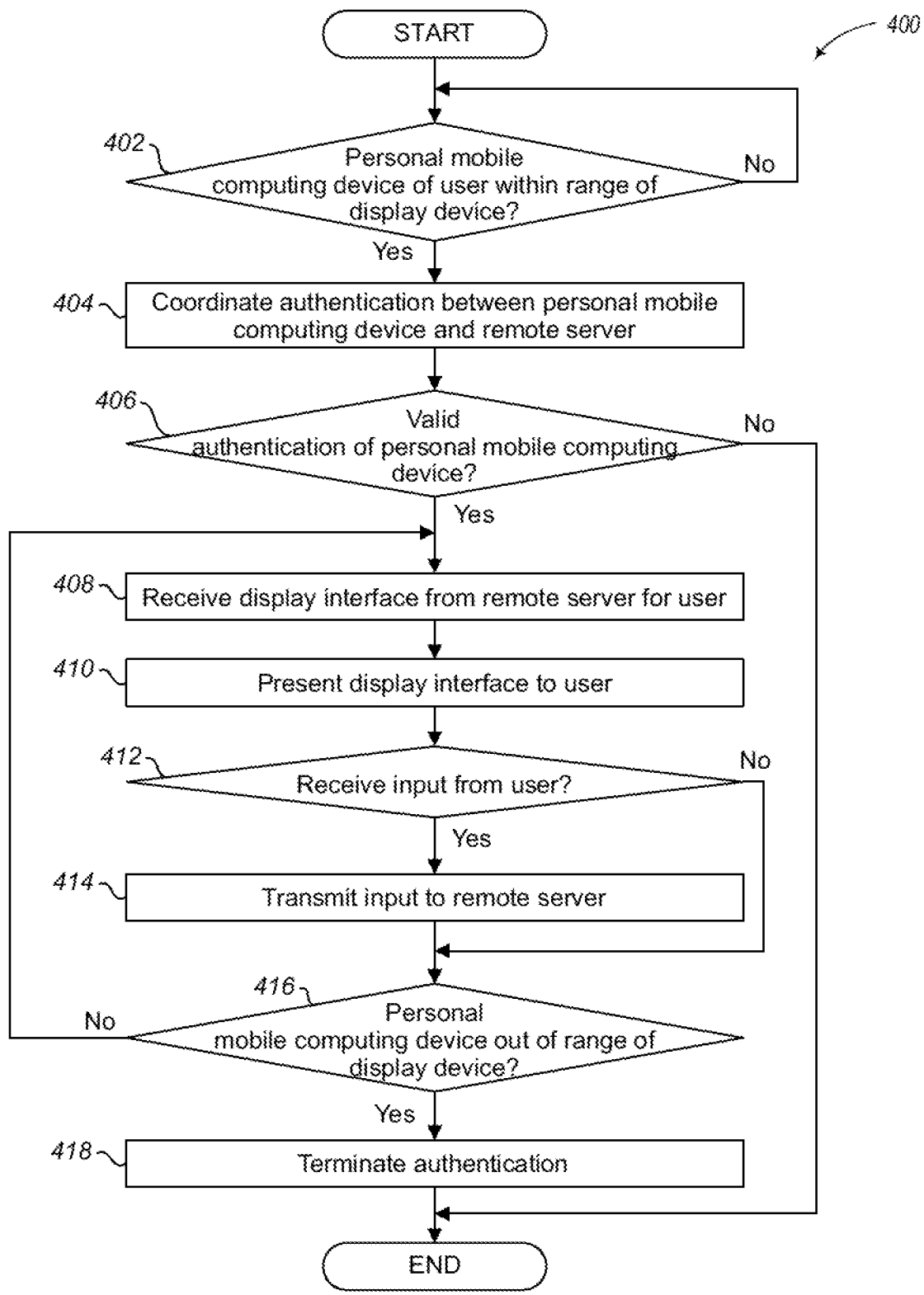
FIG. 4A illustrates a logical flow diagram generally showing one embodiment of a process for accessing a remote server from a display device to present a graphical user interface of a multi-dimensional fabric user interface in accordance with embodiments described herein.

FIG. 4A illustrates a logical flow diagram generally showing one embodiment of a process 400 for accessing a remote server from a display device to present a graphical user interface of a multi-dimensional fabric in accordance with embodiments described herein.

Process 400 begins, after a start block, at decision block 402, where a determination is made whether a personal mobile computing device of a user is within range of the display device. This determination may be made when the personal mobile computing device is within a threshold distance from the display device (e.g., using one or more range detection devices) or when the user indicates or requests to interact with the display device. If the personal mobile computing device is within range of the display device, then process 400 flows to block 404; otherwise process 400 loops to decision block 402 until a personal mobile computing device is within range of the display device.

At block 404, the display device coordinates authentication between the personal mobile computing device and a remote server. This coordination may include obtaining, requesting, or otherwise forwarding authentication keys or other information to determine the validity or authenticity of the personal mobile computing device as being authorized to access the remote server.

Process 400 proceeds to decision block 406, where a determination is made whether the personal mobile computing device is validly authenticated with the remote server. In some embodiments, the remote server may provide a token, session identifier, or other instruction to the display device indicating that the user of the personal mobile computing device is authorized to access the remote server via the display device. If the personal mobile computing device is valid, then process 400 flows to block 408; otherwise, process 400 terminates or otherwise returns to a calling process to perform other actions.

At block 408, the display device receives a display interface from the remote server for the user. In various embodiments, the display interface is customized for the user, such as if the user logged directly onto the remote server to access personal content. As described herein, this display interface is a multi-directional fabric that the user can manipulate, as described herein.

Process 400 continues at block 410, where the display device presents the display interface to the user of the personal mobile computing device. In some embodiments, the display interface is displayed directly by the display device. In other embodiments, the display interface is displayed via the personal mobile computing device.

Process 400 proceeds next to decision block 412, where a determination is made whether the display device has received input from the user. As described herein, the input may be provided via a hand gesture without touching a screen of the display device. Such hand gesture may be a swipe left or right, swipe up or down, or movement towards or away from the screen of the display device. A selection input can then be received if the user rapidly moves their hand away from the screen of the display device or if the user opens or closes his/her hand. If user input is received, then process 400 flows to block 414; otherwise, process 400 flows to decision block 416.

At block 414, the display device transmits the user input to the remote server. Process 400 proceeds to decision block 416, where a determination is made whether the personal mobile computing device is out of range of the display device (e.g., outside of a threshold distance or the user deactivated the session. If not, process 400 loops to block 408 to receive an updated or modified display interface (based on the user input) and present it to the user. If the personal mobile computing device is out of range of the display device, then process 400 flows to block 418 to terminate the authentication with the remote server.

After block 418, process 400 may terminate or otherwise return to a calling process to perform other actions. In some embodiments, process 400 may loop to decision block 402 to wait for another personal mobile computing device to be within range of the display device.

Figure 4B:
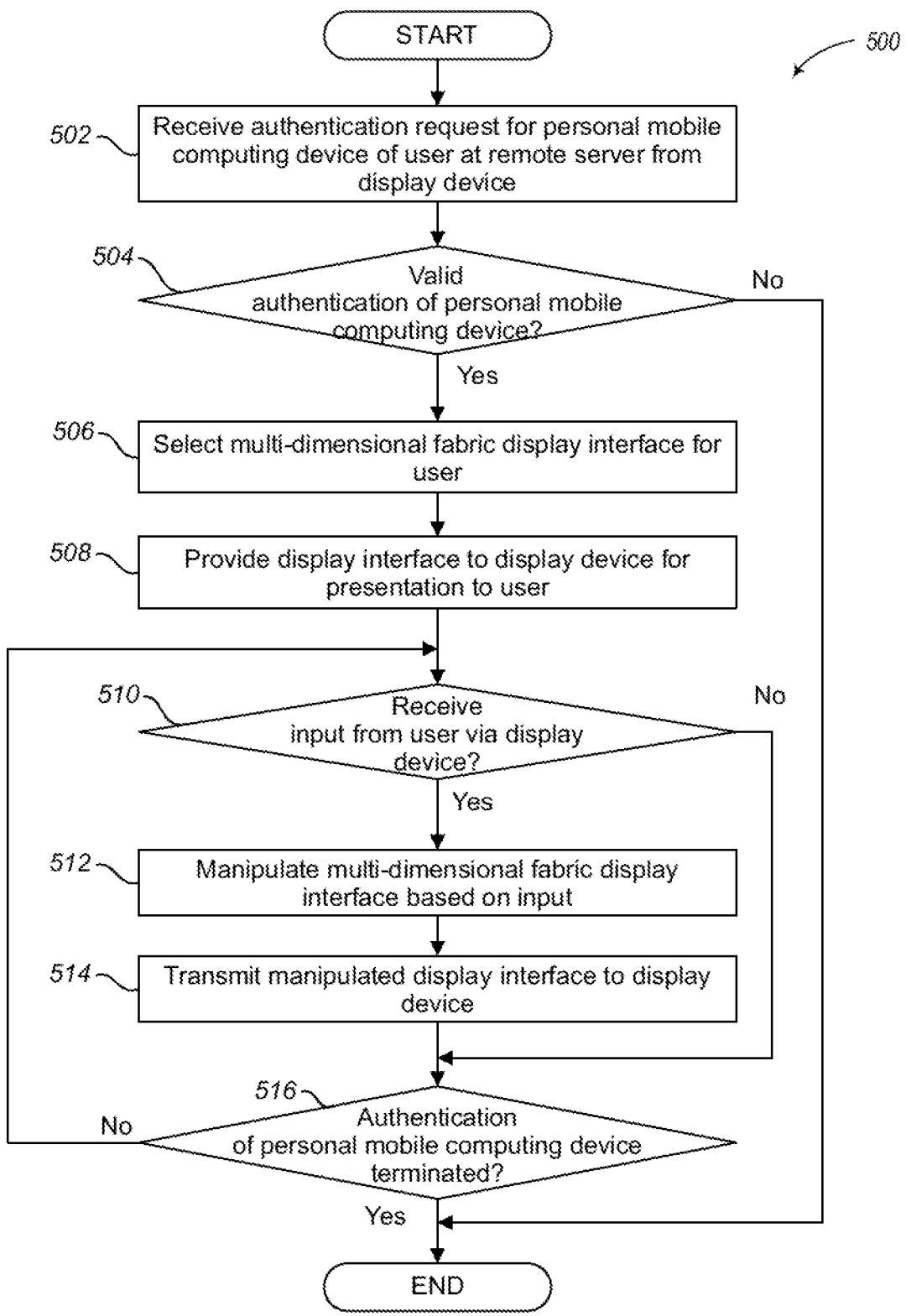
FIG. 4B illustrates a logical flow diagram generally showing one embodiment of a process for a remote server to provide a graphical user interface of a multi-dimensional fabric user interface to a display device in accordance with embodiments described herein.

FIG. 4B illustrates a logical flow diagram generally showing one embodiment of a process 450 in the augmented reality system for transferring objects and content between virtual environments 100 for a remote server to provide a graphical user interface of a multi-dimensional fabric to a display device in accordance with embodiments described herein.

Process 450 begins, after a start block, at block 452, where an authentication request is received at a remote server from a display device for a personal mobile computing device of a user. In some embodiments, the authentication request may include encryption keys, user credentials, or other authentication information.

Process 450 proceeds to decision block 454, where a determination is made whether the personal mobile computing device is validly authenticated or not. If the personal mobile computing device is valid, process 450 flows to block 456; otherwise, process 450 terminates or otherwise returns to a calling process to perform other actions.

At block 456, the remote server selects a multi-dimensional fabric display interface for the user of the personal mobile computing device. In some embodiments, the remote server instantiates or accesses a previously running version of the multi-dimensional fabric operating system for the user. In various embodiments, each separate user (or a group of multiple users) has a corresponding multi-dimensional fabric user interface accessible via the remote server. The multi-dimensional fabric user interface with content laid out in a fabric-like structure based on at least time, location, and topic such that the user can manipulate or move the fabric in one or more dimensions to select content.

Process 450 proceeds to block 458, where the remote server provides the selected display interface to the display device for presentation to the user. Process 450 continues at decision block 454, where a determination is made whether user input has been received from the display device. In various embodiments, the input may be a change or selection of one or more dimensions of the fabric or a user selection. If user input has been received, process 450 flows to block 462; otherwise, process 450 flows to decision block 466.

At block 462, the remote server manipulates the multi-dimensional fabric display interface based on the user input. In some embodiments, the manipulated display interface may include displaying specific content selected by the user. In other embodiments, the manipulated display interface may show a different section or area of the multi-dimensional fabric user interface based on the user input.

Process 450 proceeds next to block 464, where the remote server transmits the manipulated display interface to the display device. Process 450 continues next at decision block 466, where a determination is made whether the authentication of the personal mobile computing device has terminated. In some embodiments, the display device transmits a termination request to the remote server when the user of the personal mobile computing device walks away from or is out of range of the display device. If the authentication is terminated, process 450 terminates or otherwise returns to a calling process to perform other actions; otherwise, process 450 loops to decision block 460 to receive additional user input from the display device.

Referring now to FIGS. 5, 6, and 7, the system displays a multi-dimensional fabric user interface that may be accessed from disparate virtual and physical spaces a user 510 each having a processor-based computing device, such as a computer, smart phone, smart watch, or the like, for example, the personal mobile computing devices 124 or display devices 108 shown in FIG. 1. The user 510 may each enter the multi-dimensional fabric user interface and have a synchronized experience if they come to the same virtual location at the same virtual time. Additionally, as will be described in further detail below, filters are also employed by the system to control what each user 510 sees and experiences in the multi-dimensional fabric user interface, thus enabling user-control of the "what," "where," and "when." In this manner, the "where" is the virtual location within the multi-dimensional fabric user interface that corresponds to an actual physical location that the user 510 selects to visit. Next, the "when" is the time of day and date at which the user selects to visit. Finally, the "what" is the content that is visible to the user to see and interact with based on the filters selected by the user 510.

Accordingly, users 510 with the same user-selectable filters enabled have the same virtual experience in the multi-dimensional fabric user interface, while users 510 with different user-selectable filters enabled have different virtual experiences in the multi-dimensional fabric user interface while still being in the same common virtual space. In some embodiments of the multi-dimensional fabric, the user 510 may interact with the virtual location (and potentially other users) in the multi-dimensional fabric user interface to buy or sell goods or content, upload content to or download content from the multi-dimensional fabric, post, live stream, and the like. In one or more embodiments, the user 510 interacts with the multi-dimensional fabric user interface by anchoring digital content 520 to a fixed location in the multi-dimensional fabric user interface of the common virtual space. In other embodiments, the user 510 interacts with the multi-dimensional fabric user interface by anchoring digital content 530 to a user 510 (e.g., himself, herself, or another user) in the multi-dimensional fabric user interface of the common virtual space.

In another aspect of some embodiments of the system, the user 510 enters the multi-dimensional fabric user interface from different physical locations, each using their own processor-based computing device. The user 510 may go to a multi-dimensional fabric user interface, which may be configured to represent an actual location in the real world. The multi-dimensional fabric user interface may contain virtual storefronts 540 of actual stores in the physical world. The multi-dimensional fabric user interface may also contain advertisements 550, 560 at a specific physical location, as shown in FIGS. 6 and 7. Specifically, FIG. 5 shows a multi-dimensional fabric user interface that provides a virtual representation of an actual physical location at a first time that contains virtual storefronts 540 but which contains no advertisements. FIG. 6 shows a multi-dimensional fabric user interface that provides a virtual representation of an actual physical location at a second time that contains virtual storefronts 540 and which contains advertisements 550. FIG. 7 shows a multi-dimensional fabric user interface that provides a virtual representation of actual physical location at a third time that contains virtual storefronts 540 and which contains advertisements 550 and advertisements 560.

In some embodiments, the advertisements 550, 560 in the multi-dimensional fabric user interface at a specific physical location, such as a Billboard on a specific street (e.g., Sunset Boulevard in Los Angeles, Calif.) may display the same advertisement as in the actual physical world, while in other embodiments the advertisements 550, 560 in the multi-dimensional fabric user interface at a specific physical location may display different advertisements if a user 510 anchors different digital content 520 at that virtual location (which represents an actual physical location). The multi-dimensional fabric user interface is created by anchoring digital content 520 to virtual locations that represent physical location, not by digitizing the actual physical locations. In various embodiments, digital content 520 is anchored to a location and time within the multi-dimensional fabric user interface by the corresponding storage location of the content.

Various embodiments, of the multi-dimensional fabric described herein can be used for a variety of different content storage technologies. One example technology is the fluid timeline social network described in U.S. patent application Ser. No. 16/300,028, filed Nov. 8, 2018, titled FLUID TIMELINE SOCIAL NETWORK, and issued Aug. 18, 2020, as U.S. Pat. No. 10,747,414, which is incorporated herein by reference.

Significantly, the user 510 may choose to visit not only a specific place, but also a specific time in the multi-dimensional fabric user interface. For example, the user 510 of the system for multi-dimensional fabric user interface may choose to go to a specific physical location in the past at a specific time and date (e.g., go to a concert venue when a specific concert occurred, go to a historical location when a historical event occurred, go to a restaurant when a friend's birthday occurred, go to a church when a relative's wedding occurred, and the like). As shown in FIGS. 5, 6, and 7, in these embodiments the multi-dimensional fabric user interface displays the objects and events that are anchored to that specific location and time. This is distinct from the embodiments shown in FIGS. 2 and 3 where time and distance were used as axes. Additionally, the user 510 of the multi-dimensional fabric user interface may choose to go to a specific physical location in the future at a specific time and date (e.g., go to a concert venue when a specific concert will occur, go to a historical location when a historical event will likely occur, go to a restaurant when a friend's birthday will occur, go to a church when a relative's wedding will occur, and the like). Further, a user 510 may want to go to a location in the future and see what mobile vendors (i.e., food trucks) are available at a particular location. Moreover, in some embodiments, virtual storefronts 540 are dynamically tailored with advertisements that are set at fixed locations for a fixed time period, or as part of a live feed. A user 510 may also post advertisements 550, 560 at a time adjacent to future event or sale. In various embodiments, digital content 520 is anchored to a specific time and date in the multi-dimensional fabric user interface by the corresponding storage time of the content.

Figure 8A:
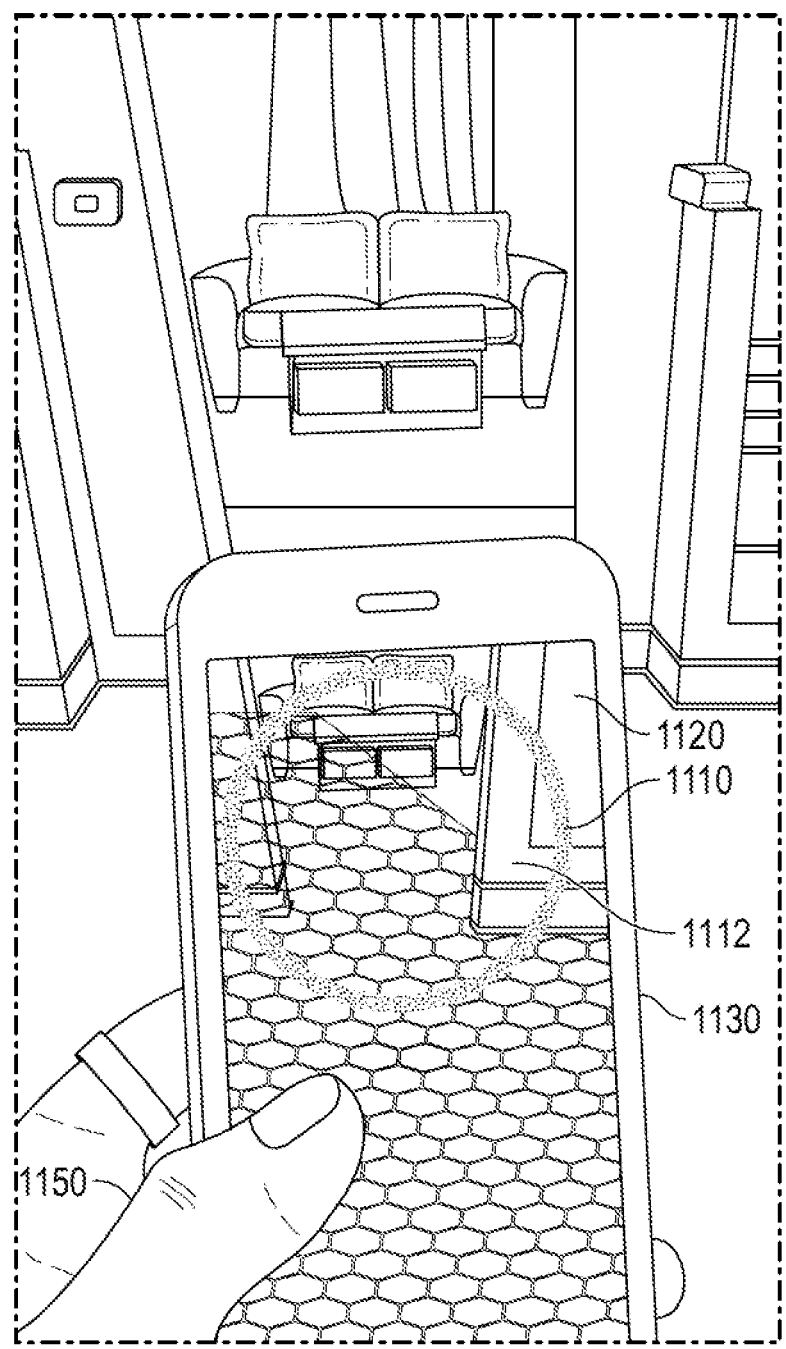
FIG. 8A illustrates a multi-dimensional fabric user interface in an augmented reality system that displays the initial formation of a portal and a virtual representation of a first actual physical location through a personal mobile computing device.
Figure 8B:
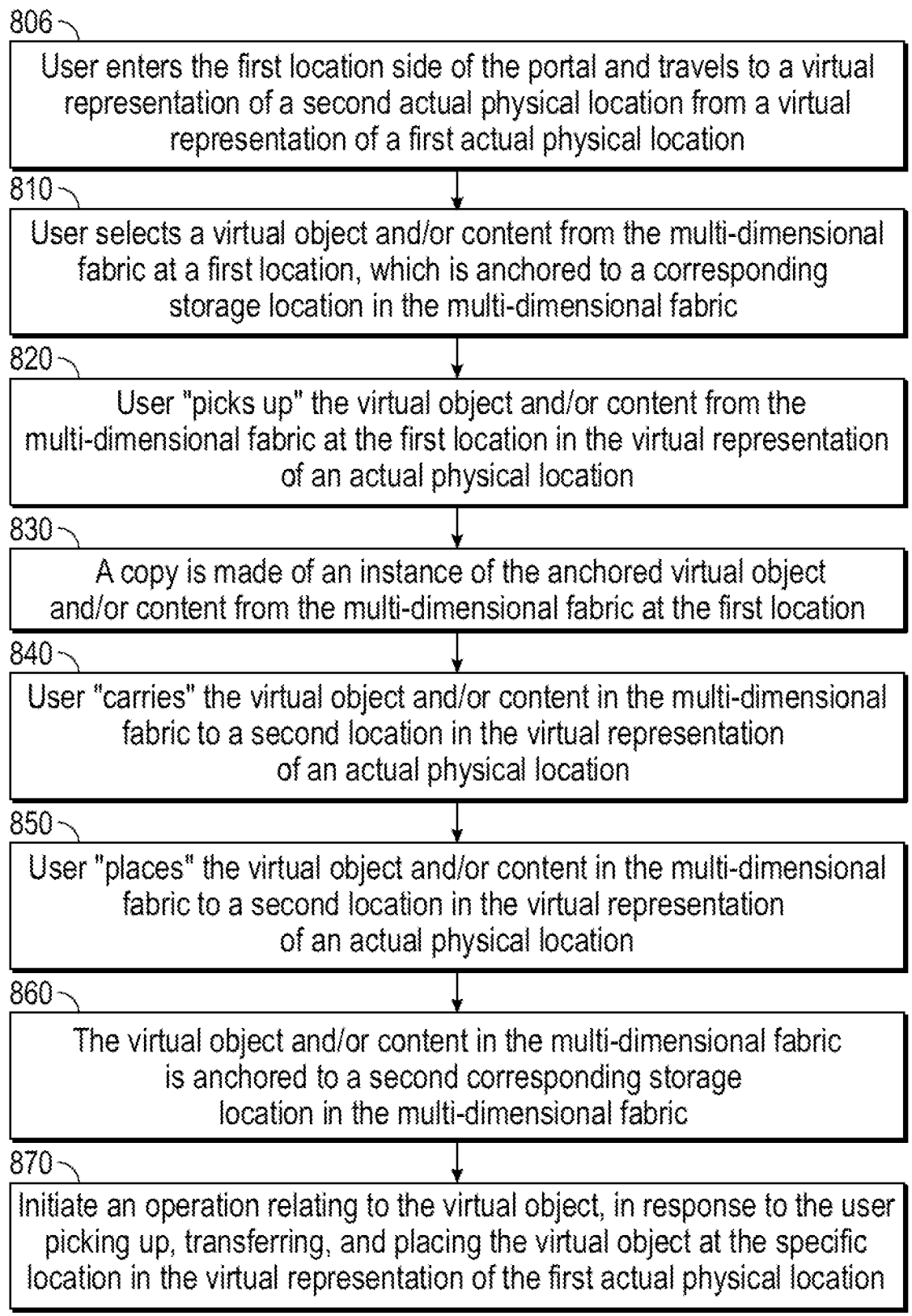
FIG. 8B illustrates a logic diagram of virtual object or content being moved from a first location the multi-dimensional fabric to a second location the multi-dimensional fabric via the portal, results in movement from a first anchored storage location to a second anchored storage location.
Figure 9:
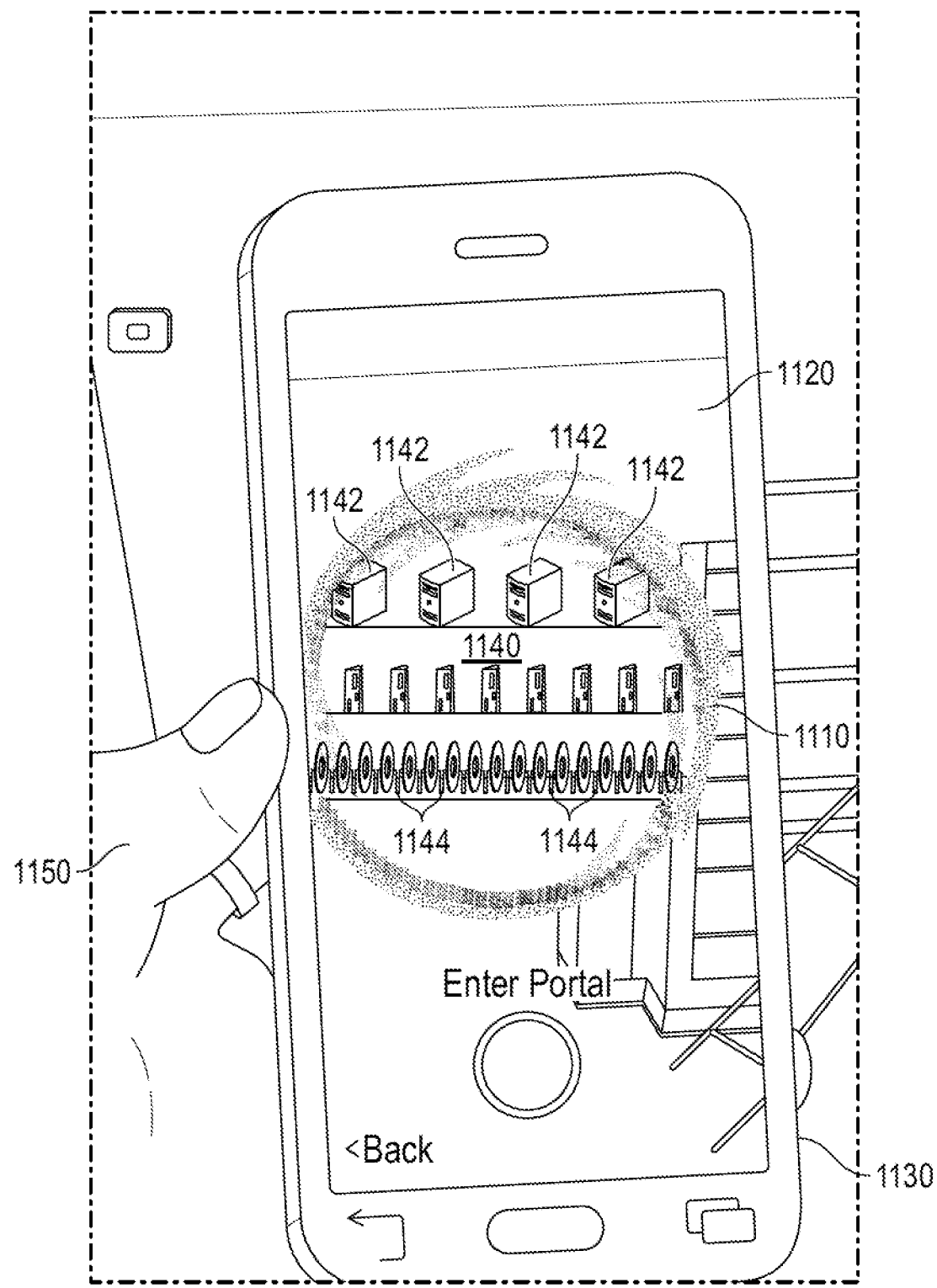
FIG. 9 illustrates a multi-dimensional fabric user interface in an augmented reality system that displays the portal in a virtual representation of the first actual physical location through the personal mobile computing device, wherein a virtual representation of a second actual physical location is viewable through the portal.

Referring now to FIGS. 8A, 8B, and 9, in some embodiments of the augmented reality system for transferring objects and content between virtual environments, the remote server 102 (shown in FIG. 1) enables the user to create a portal 1110. Specifically, in one or more such embodiments the user employs a personal mobile computing device 1130 through which a virtual representation of a first actual physical location 1120 may be seen. As shown in FIG. 8A, the remote server 102 enables the user 1150 of the augmented reality system to form a portal 1110 in the virtual representation of the first actual physical location 1120 as viewed in a display screen of the personal mobile computing device 1130. The remote server 102 of the augmented reality system enables the user 1150 to anchor the portal 1110 to the multi-dimensional fabric user interface in the same manner that digital content is anchored to the multi-dimensional fabric user interface. For example, the portal 1110 can be anchored to a specific location and time within a multi-dimensional fabric described herein (e.g., the virtual representation of the first actual physical location 1120). In this same manner, the user 1150 may anchor the other side of the portal 1110 to another specific location and time within a multi-dimensional fabric described herein (e.g., the virtual representation of a second actual physical location 1140). Thus, the portal 1110 may be used to travel virtually in both space and time.

Referring now jointly to FIGS. 8B-15, at 806, the user 1150 enters the first location side of the portal and travels to a virtual representation of a second actual physical location from a virtual representation of a first actual physical location. At 810, the user 1150 selects a virtual object and/or content from the multi-dimensional fabric at a first location, which is anchored to a corresponding storage location in the multi-dimensional fabric. At 820, the user 510 picks up the virtual object and/or content from the multi-dimensional fabric at the first location in the virtual representation of an actual physical location. At 830, a copy is made of an instance of the anchored virtual object and/or content from the multi-dimensional fabric at the first location, in response to the operation at 820. In other embodiments, such as where there is a single instance of a virtual object and/or content, the remote server of the augmented reality system enables the user to move the instance of the anchored virtual object and/or content from the multi-dimensional fabric at a first location and time. In some such embodiments, the virtual object and/or content is unanchored from the multi-dimensional fabric at the first location when the object is picked up by the user 510. At 840, the user 510 carries the virtual object and/or content in the multi-dimensional fabric to a second location in the virtual representation of an actual physical location. At 850, the user 510 places the virtual object and/or content in the multi-dimensional fabric to a second location in the virtual representation of an actual physical location. At 860, the virtual object and/or content in the multi-dimensional fabric is then anchored to a second corresponding storage location in the multi-dimensional fabric, in response to the operation at 850. At 870, the system initiates an operation relating to the virtual object, in response to the user picking up, transferring, and placing the virtual object at the specific location in the virtual representation of the first actual physical location.

As shown in FIG. 9, a multi-dimensional fabric user interface in an augmented reality system displays a portal 1110 in another view within a virtual representation of the first actual physical location 1120 through the display screen of the personal mobile computing device 1130. The portal 1110 has a first location side 1112 (see FIG. 8A) in the virtual representation of the first actual physical location 1120 and a second location side 1114 (see FIG. 11) in the virtual representation of a second actual physical location 1140. The virtual representation of the second actual physical location 1140 is viewable through the portal 1110 once the portal 1110 is activated. Thus, the augmented reality system enables the user 1150 to look through the first location side of the portal 1110 and see the virtual representation of the second actual physical location 1140 in the multi-dimensional fabric user interface, including virtual objects 1142 and/or content 1144 shown therein. The portal 1110 facilitates virtual travel to the virtual representation of the second actual physical location 1140 in the multi-dimensional fabric user interface.

Moreover, in one or more embodiments, the augmented reality system enables the user to look through the first location side of the portal 1110, as shown in FIG. 9, and see other users (not shown) in the virtual representation of the second actual physical location 1140 in the multi-dimensional fabric user interface. These other users could get to the virtual representation of the second actual physical location 1140 in this same manner; i.e., by creating a portal and anchoring the other side of the portal 1110 to the virtual representation of the second actual physical location 1140).

In some such embodiments, the augmented reality system enables the user to look through the first location side of the portal 1110 and pick up virtual objects 1142 and/or content 1144 in the virtual representation of the second actual physical location 1140 in the multi-dimensional fabric user interface, while still remaining in the virtual representation of the first actual physical location 1120 in the multi-dimensional fabric user interface. Such interaction through the portal 1110 is similar to the action of a customer interacting with a vender through a service window. Additionally, the augmented reality system also enables the user to carry the picked up virtual objects 1142 and/or content 1144 to another location in the same virtual representation of an actual physical location 1140 (or to a virtual representation of another actual physical location, such as but not limited to the first actual physical location). Furthermore, the augmented reality system 100 enables the user to place the one or more of the virtual objects 1142 and/or content 1144 at a specific location in the virtual representation of the another actual physical location, which initiates an operation related to the virtual objects 1142 and/or content 1144.

Moreover, in some embodiments, the augmented reality system enables the user to initiate the operation relating to the one or more of the virtual objects 1142 and/or content 1144, in response to the user picking up, transferring, and placing the one or more of the virtual objects 1142 and/or content 1144 at a specific location. These operations include by way of example only, and not by way of limitation: uploading data, downloading data, posting data, live streaming data, purchasing a product or service, selling a product of service, anchoring digital content to the multi-dimensional fabric, and modifying previously anchored digital content on the multi-dimensional fabric.

Figure 10:
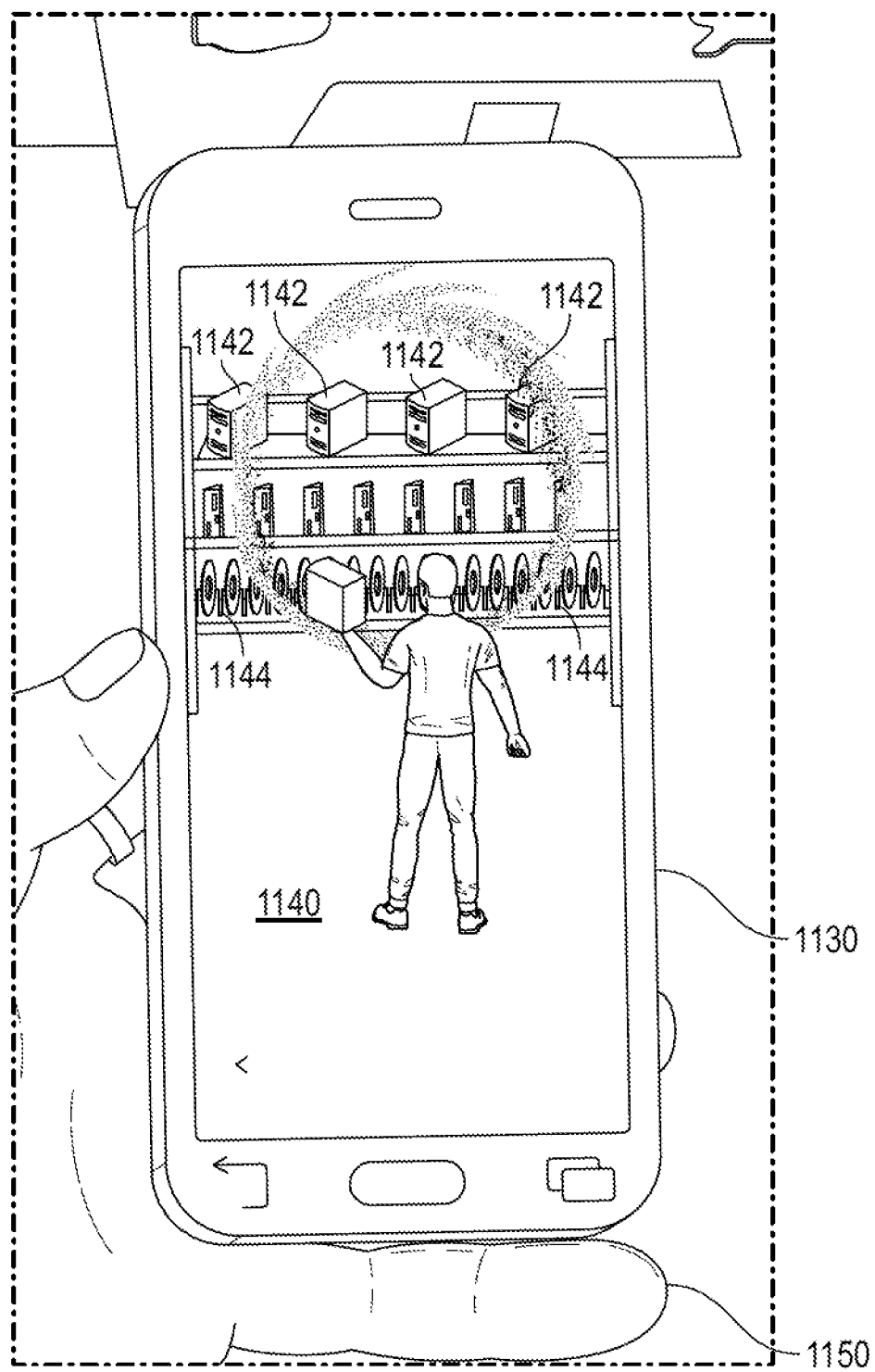
FIG. 10 illustrates a multi-dimensional fabric user interface in an augmented reality system that displays the virtual representation of the second actual physical location through the personal mobile computing device after the user walks through the portal and picks up an object or content.

In various embodiments, the virtual objects 1142 and/or content 1144 are anchored to a location and time within the multi-dimensional fabric using a corresponding storage location of the content within the multi-dimensional fabric. In some embodiments, such as where there are multiple instances of the virtual objects 1142 and/or content 1144, the remote server 102 of the augmented reality system enables the user 1150 to copy an instance of the anchored virtual objects 1142 and/or content 1144 from the multi-dimensional fabric at a first location and time, and insert the copied instance of the anchored virtual objects 1142 and/or content 1144 to the multi-dimensional fabric at a new location and time by using a second corresponding storage location of the content within the multi-dimensional fabric. In other embodiments, such as where there is a single instance of a virtual object 1142 and/or content 1144, the remote server 102 of the augmented reality system enables the user 1150 to move the instance of the anchored virtual object 1142 and/or content 1144 from the multi-dimensional fabric at a first location and time, and insert the moved instance of the anchored virtual object 1142 and/or content 1144 to the multi-dimensional fabric at a new location and time by using a second corresponding storage location of the content within the multi-dimensional fabric. Referring now to FIG. 10, the user 1150 has now stepped into the portal 1110 shown in FIG. 9, and has been transported to the second actual physical location 1140 where the virtual objects 1142 and/or content 1144 may be seen. In some embodiments of the augmented reality system, the remote server 102 enables the user 1150 to enter the first location side of the portal 1110 and virtually travel to the virtual representation the second actual physical location 1140 in the multi-dimensional fabric user interface. While the user 1150 is in the multi-dimensional fabric user interface that virtually represents a second actual physical location 1140, the augmented reality system enables the user to interact with the virtual objects 1142 and/or content 1144 in the virtual representation of the second actual physical location 1140.

In some embodiments, the virtual objects 1142 and/or content 1144 may be picked up from their storage location by a user in the second actual physical location 1140. Additionally, the augmented reality system also enables the user to carry the picked up the virtual objects 1142 and/or content 1144 to another location in the same virtual representation of the second actual physical location 1140 (or to a virtual representation of another actual physical location, such as but not limited to the first actual physical location). For example, the user may carry the picked up the virtual objects 1142 and/or content 1144 through a portal. Furthermore, the augmented reality system 100 enables the user to place the one or more of the virtual objects 1142 and/or content 1144 at a specific location in the virtual representation of the another actual physical location, which initiates an operation related to the virtual objects 1142 and/or content 1144.

Moreover, in some embodiments, the augmented reality system enables the user to initiate the operation relating to the one or more of the virtual objects 1142 and/or content 1144, in response to the user picking up, transferring, and placing the one or more of the virtual objects 1142 and/or content 1144 at a specific location. Again, such operations include by way of example only, and not by way of limitation: uploading data, downloading data, posting data, live streaming data, purchasing a product or service, selling a product of service, anchoring digital content to the multi-dimensional fabric, modifying previously anchored digital content on the multi-dimensional fabric, and moving anchored digital content in the multi-dimensional fabric from one location to another location.

In another embodiment, a user 1150 may upload any augmented reality scenery into the multi-dimensional fabric user interface that is desired (e.g., a third actual physical location, a fourth actual physical location, fifth actual physical location, a space based theoretical physical location, a past actual physical location that no longer exists, an anticipated future physical location that has not yet been built, and the like).

Figure 11:
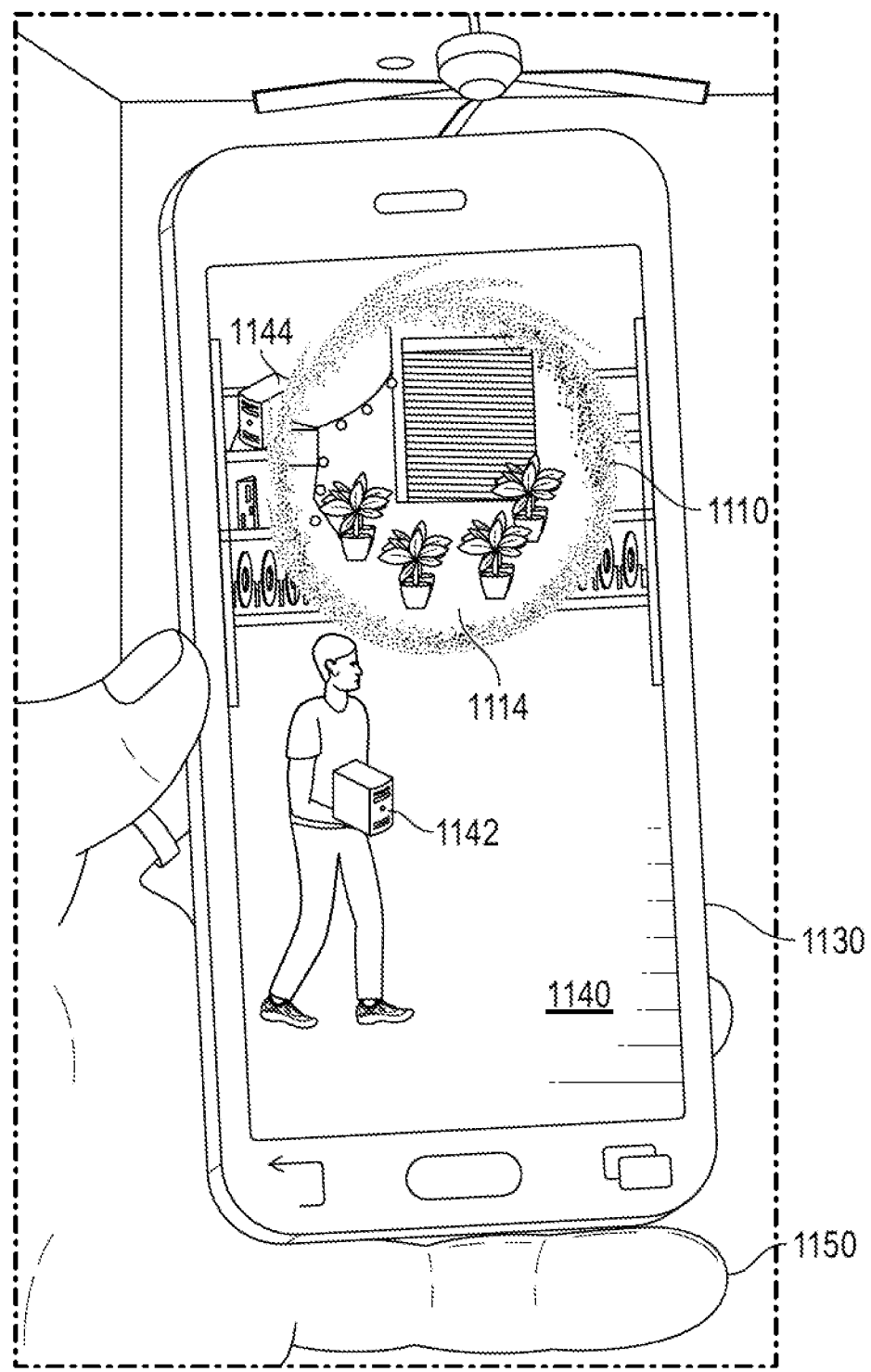
FIG. 11 illustrates a multi-dimensional fabric user interface in an augmented reality system that displays the portal in the virtual representation of the second actual physical location through the personal mobile computing device, wherein the virtual representation of the first actual physical location is viewable through the portal, and user the carrying the object or content.

Referring now to FIG. 11, in some embodiments of the augmented reality system, while the user 1150 is in the virtual representation of the second actual physical location 1140, the user 1150 may view the portal 1110 in the display screen of the personal mobile computing device 1130 and see the virtual representation of the first actual physical location 1120 through the portal 1110. As discussed with respect to the other side of the portal 1110, the augmented reality system enables the user to look through the second location side of the portal 1110, as shown in FIG. 11, and see other users (not shown) in the virtual representation of the first actual physical location 1120 in the multi-dimensional fabric user interface.

In some such embodiments, the augmented reality system enables the user to look through the second location side of the portal 1110 and interact with one or more of other users, virtual objects 1142 and/or content 1144, virtual locations, and virtual events in the virtual representation of the first actual physical location 1120 in the multi-dimensional fabric user interface, while still remaining in the virtual representation of second first actual physical location 1120 in the multi-dimensional fabric user interface. As described above, these interactions include by way of example only, and not by way of limitation: uploading data, downloading data, posting data, live streaming data, purchasing a product or service, selling a product of service, anchoring digital content to the multi-dimensional fabric, modifying previously anchored digital content on the multi-dimensional fabric, and moving anchored digital content in the multi-dimensional fabric from one location to another location.

Figure 12A:
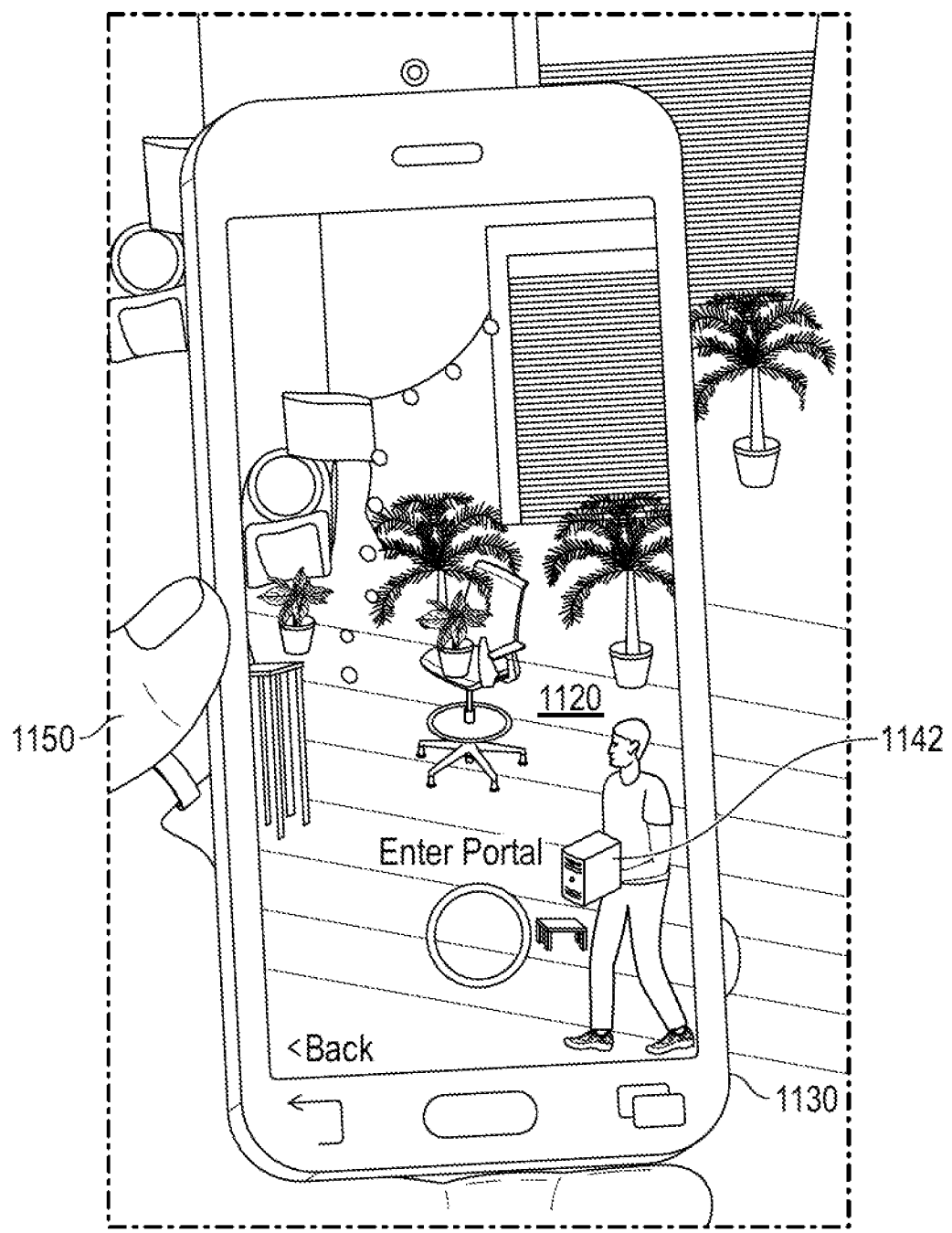
FIG. 12A illustrates a multi-dimensional fabric user interface in an augmented reality system that displays the virtual representation of the first actual physical location through the personal mobile computing device after the user walks back through the portal with the object or content that the user picked up.

Further, in some embodiments shown in FIG. 12A, the augmented reality system enables the user 1150 to enter the second location side of the portal 1110 (i.e., with the user looking in the opposite direction) and virtually travel back to the virtual representation of the first actual physical location 1120 in the multi-dimensional fabric user interface while carrying the virtual objects 1142 and/or content 1144 picked up from the storage location in the second actual physical location 1140. In an aspect of some embodiments, this action is viewable through the display screen of the user's personal mobile computing device 1130.

Figure 12B:
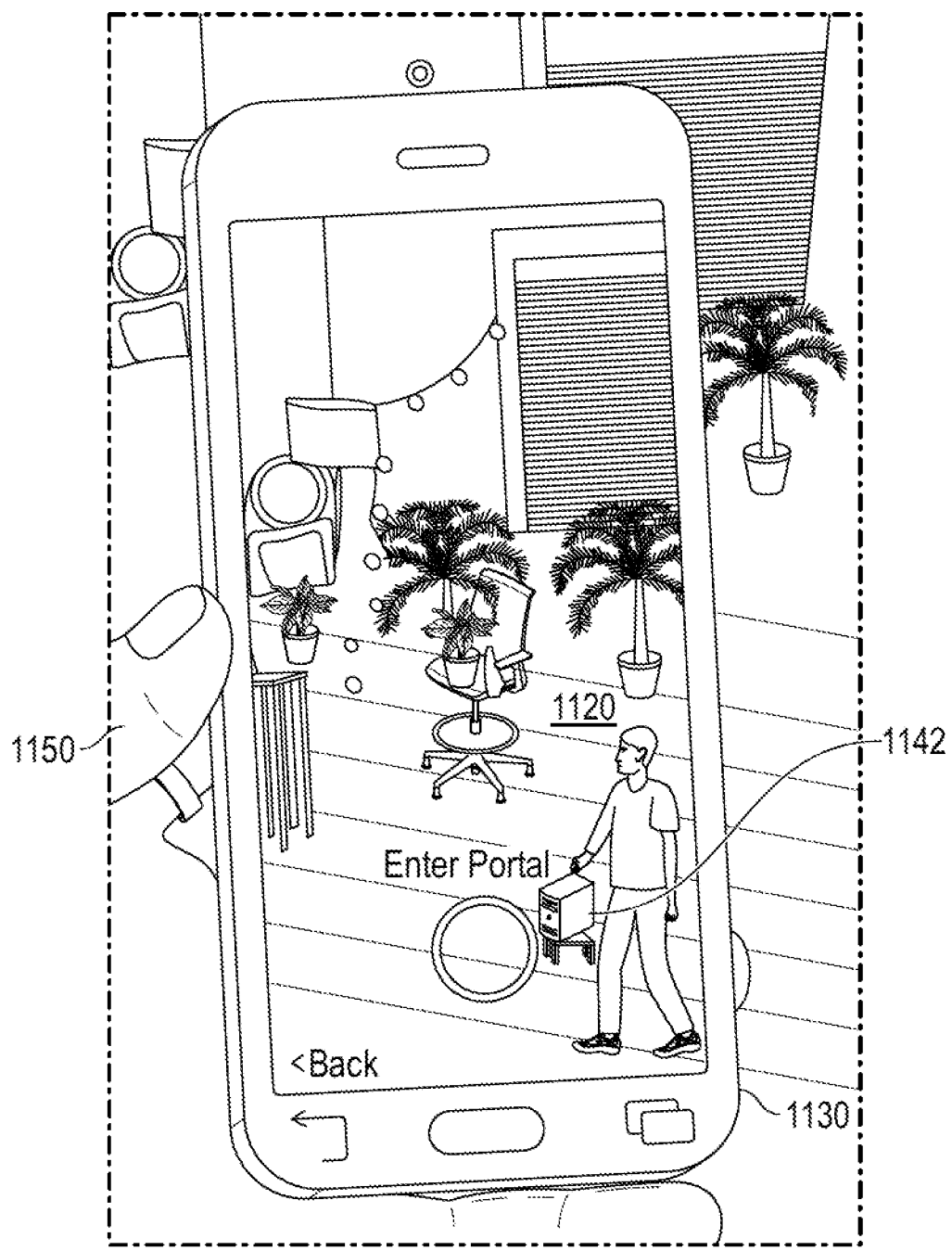
FIG. 12B illustrates a multi-dimensional fabric user interface in an augmented reality system that displays the virtual representation of the first actual physical location through the personal mobile computing device after the user walks back through the portal and places the object or content that the user picked up in the virtual representation of the first actual physical location.

As shown in FIG. 12B, in yet other embodiments, the multi-dimensional fabric user interface in the augmented reality system displays the virtual representation of the first actual physical location through the personal mobile computing device after the user walks back through the portal. In some such embodiments, the user then places the virtual objects 1142 and/or content 1144 that the user picked up in the virtual representation of the first actual physical location. Once again, this action may be viewable through the display screen of the user's personal mobile computing device 1130.

In another embodiment of the augmented reality system, the user 1150 opens another portal and takes the virtual objects 1142 and/or content 1144 that the user picked up in the virtual representation of the first actual physical location to a virtual representation of a third actual physical location. For example, in one embodiment, the user begins in his kitchen (e.g., a virtual representation of a first actual physical location), enters a first portal 1110 and goes to a restaurant in New York (e.g., a virtual representation of a second actual physical location) and grabs a recipe (e.g., virtual content 1144). Instead of reentering the first portal 1110 and returning to the user's 1150 kitchen, in this embodiment the user 1150 enters another portal to the user's parents' house (e.g., a virtual representation of a third actual physical location). In such an embodiment, the user 1150 then stores the recipe (e.g., virtual content 1144) on the multi-dimensional fabric at the user's parent's house.

Figure 13:
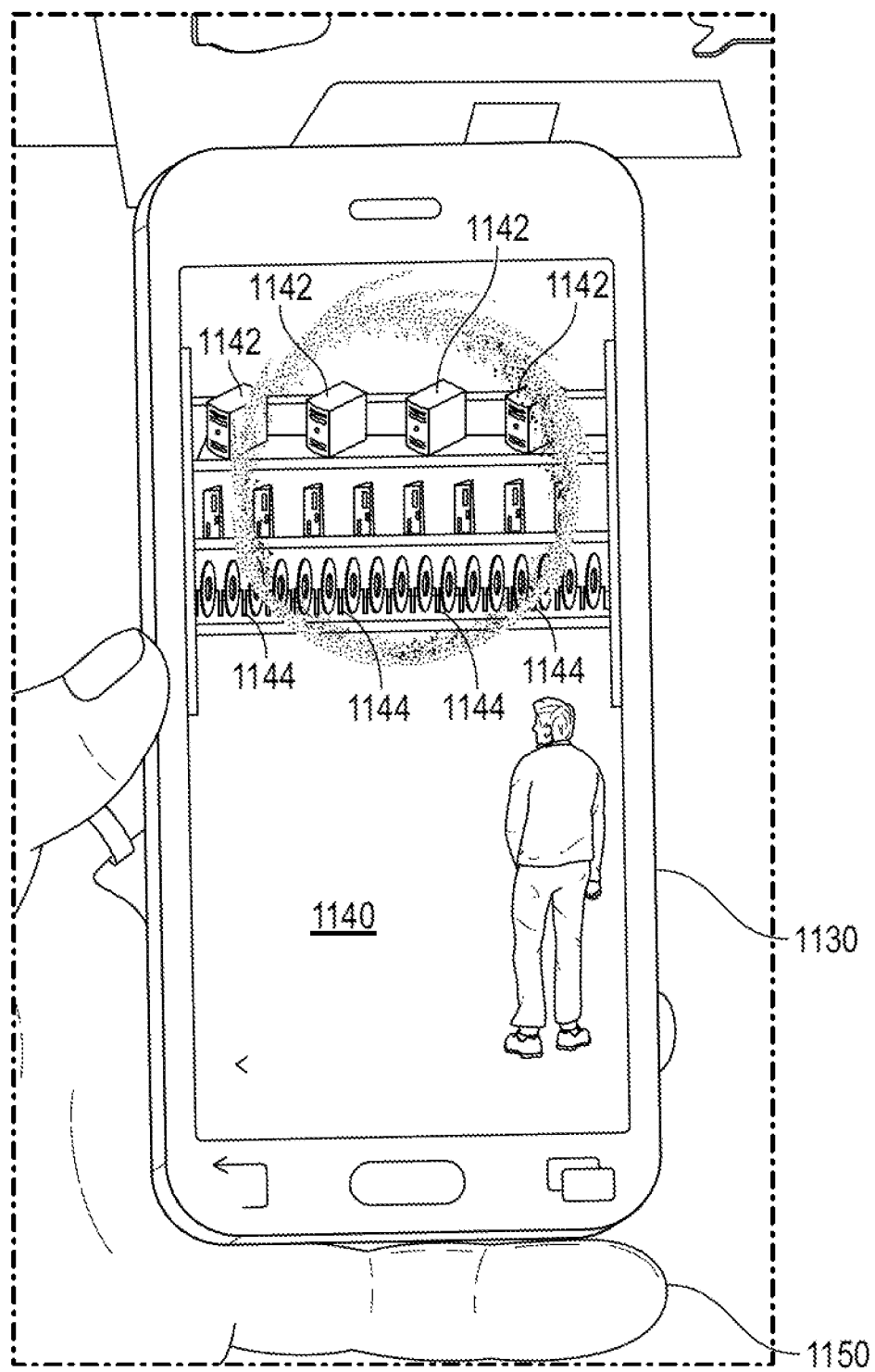
FIG. 13 illustrates a multi-dimensional fabric user interface in an augmented reality system that displays virtual objects and/or content being picked up from a storage location by a user at a first location in a virtual representation of an actual physical location and moved to second location.

Referring now to FIG. 13, as described above, in some embodiments of the augmented reality system, the virtual objects 1142 and/or content 1144 may be picked up from their storage location by a user at a first location in a virtual representation of an actual physical location and moved to second location. In one or more such embodiments, the object moved from the first location to the second location is a device, such as by way of example only, and not be way of limitation: a computer, peripheral device, audiovisual device, kitchen appliance, household furniture, or the like. In one or more other embodiments, the content moved from the first location to the second location is, by way of example only, and not be way of limitation: digital content, such as a recipe, digital book, digital music, software application, or the like.

Figure 14:
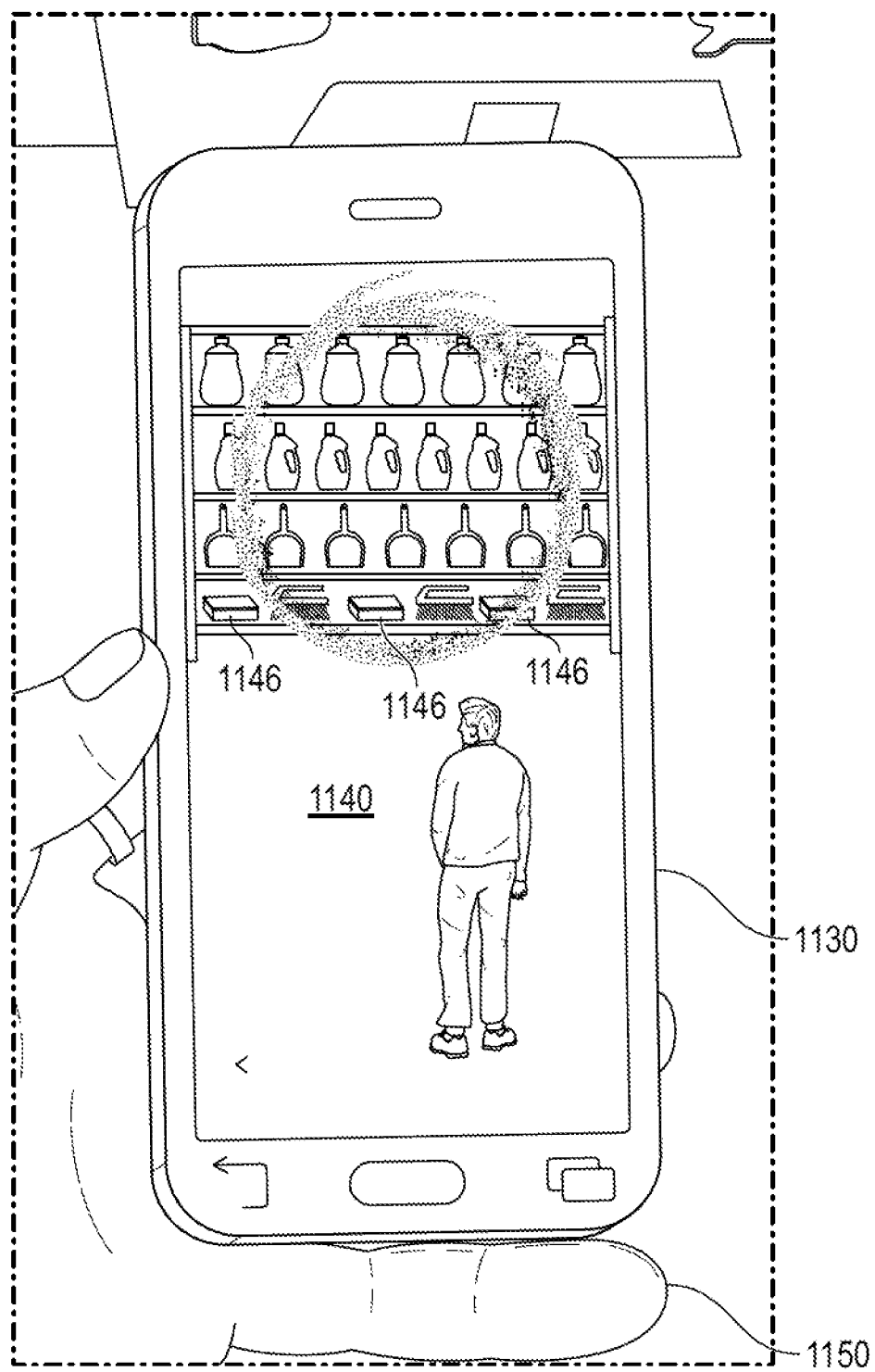
FIG. 14 illustrates a multi-dimensional fabric user interface in an augmented reality system displaying virtual objects that each represent a service being picked up from a storage location by a user at a first location in a virtual representation of an actual physical location and moved to second location.

Referring now to FIG. 14, in other embodiments of the augmented reality system, the virtual object picked up from their storage location by a user at a first location in a virtual representation of an actual physical location and moved to second location represents a service 1146. In one or more such embodiments, the virtual object moved from the first location to the second location that represents a service is, by way of example only, and not be way of limitation: Infrastructure As A Service (IaaS), Platform As A Service (PaaS), Desktop As A Service (DaaS), Managed Software As A Service (MSaaS), Mobile Backend As A Service (MBaaS), Datacenter As A Service (DCaaS), and Information Technology Management As A Service (ITMaaS), a house cleaning service, a babysitting service, a carwash service, a home repair service, or the like.

Figure 15:
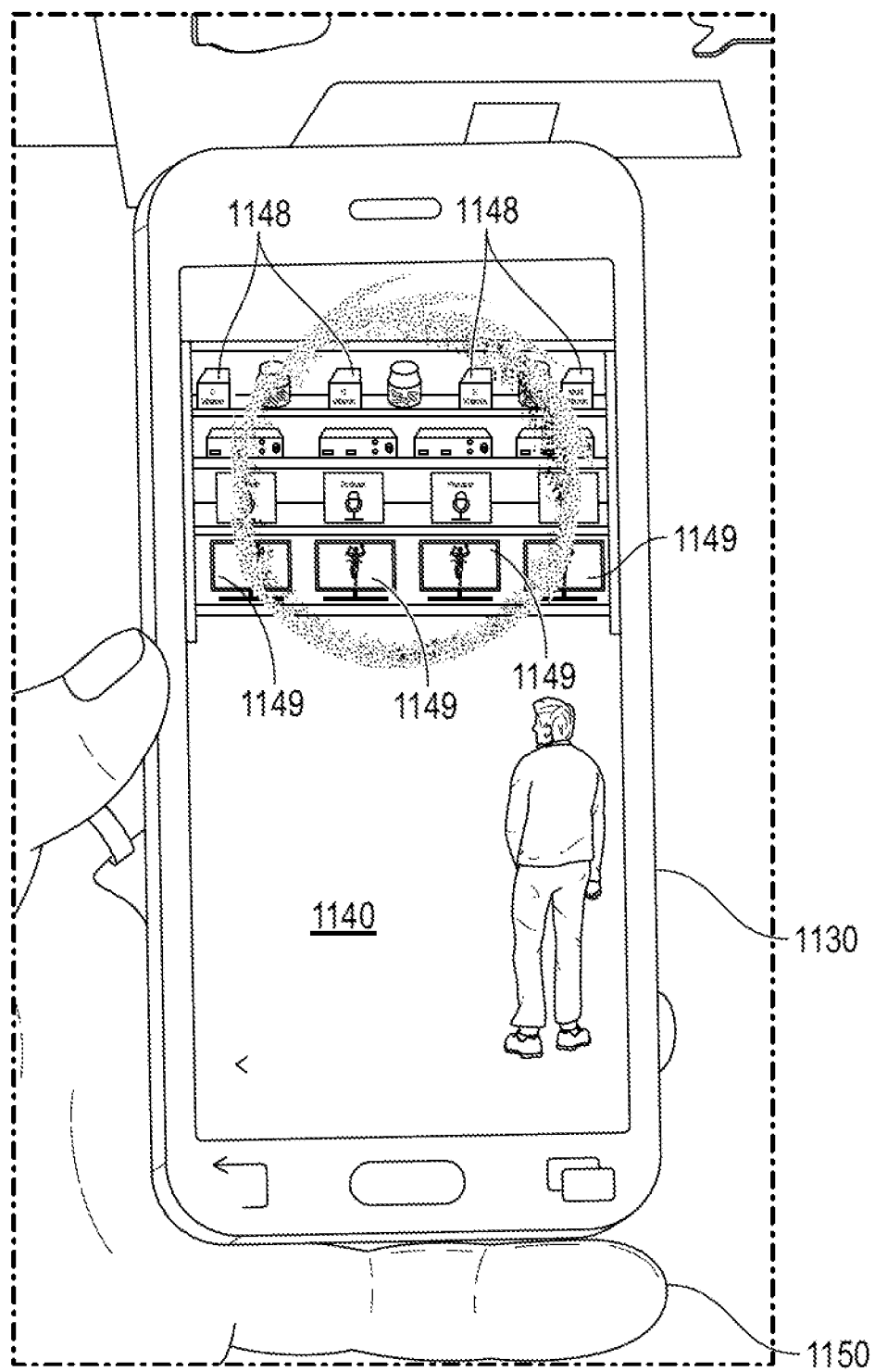
FIG. 15 illustrates a multi-dimensional fabric user interface in an augmented reality system displaying virtual objects that each represent a reoccurring product or reoccurring content being picked up from a storage location by a user at a first location in a virtual representation of an actual physical location and moved to second location.

Referring now to FIG. 15, in still other embodiments of the augmented reality system, the virtual object picked up from the storage location by a user at a first location in a virtual representation of an actual physical location and moved to second location represents a reoccurring product or content. In one or more such embodiments, the virtual object moved from the first location to the second location that represents a reoccurring product 1148 is, by way of example only, and not be way of limitation: a reoccurring vitamin product, a reoccurring food product, a reoccurring drink product, a reoccurring personal care (toiletries) product, or the like. In one or more other embodiments, the virtual object moved from the first location to the second location that represents reoccurring digital content 1149 is, by way of example only, and not be way of limitation: a podcast series, television series, educational seminar series, or the like.

In some embodiments, the augmented reality system enables the user to initiate the operation relating to the one or more of virtual objects 1142 and/or content 1144, in response to one or more of the user picking up, transferring, and placing the virtual objects 1142 and/or content 1144 at a specific location. Additionally, in some such embodiments, the operation is a purchase or a temporary license to use a device, content, or service for a period of time. In many such embodiments, this purchase or license involves the exchange of monetary currency or payment of some kind. Accordingly, in some implementations, a user can have one or more credit cards, bank accounts, or other payment sources on file with various stores in the virtual representation of an actual physical location. In this manner, then when the user initiates an operation relating to selected virtual objects 1142 and/or content 1144, in response to one or more of the user picking up, transferring, and placing the virtual objects 1142 and/or content 1144 at a specific location, the credit cards, bank accounts, or other payment sources on file are automatically charged for the operation.

In some embodiments, the augmented reality system enables the user to create a link for future information transfer to the one or more of virtual objects 1142 and/or content 1144, in response to one or more of the user picking up, transferring, and placing the virtual objects 1142 and/or content 1144 at a specific location. In other embodiments, the augmented reality system enables the user to create a link for future purchases to the one or more of virtual objects 1142 and/or content 1144, in response to one or more of the user picking up, transferring, and placing the virtual objects 1142 and/or content 1144 at a specific location.

In other embodiments of the augmented reality system, a manual payment process is utilized by the system. In still other implementations, a user can have different credit cards, bank accounts, or other payment sources on file with different stores in the virtual representation of an actual physical location. For example, a first credit card, bank account, or other payment source is saved and used with a first store, a second credit card, bank account, or other payment source is saved and used with a second store, a third credit card, bank account, or other payment source is saved and used with a third store, and so on. Finally, in yet other implementations, a user can select a single credit card, bank account, or other payment source on file for every stores in the virtual representation of an actual physical location.

Figure 16:
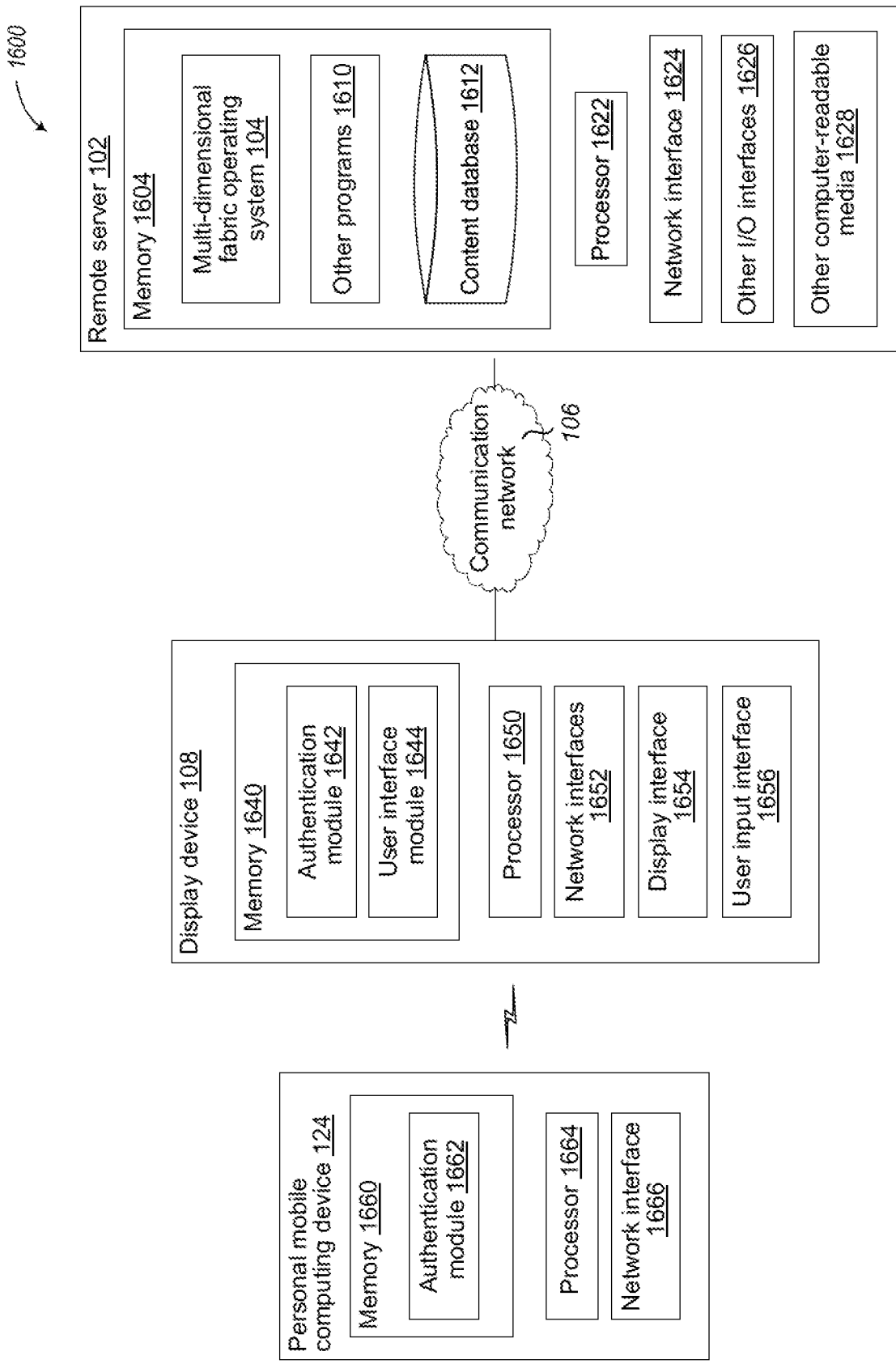
FIG. 16 illustrates a system diagram that describes one implementation of computing systems for implementing embodiments described herein.

FIG. 16 shows a system diagram that describes one implementation of computing systems for implementing embodiments described herein. System 600 includes remote server 102, one or more display devices 108, and one or more personal mobile computing devices 124.

As described herein, the remote server 102 is a computing device that can perform functionality described herein for implementing an operating system that provides a multi-dimensional fabric user interface for storing content. One or more special purpose computing systems may be used to implement the remote server 102. Accordingly, various embodiments described herein may be implemented in software, hardware, firmware, or in some combination thereof. The remote server 102 includes memory 1604, one or more processors 1622, network interface 1624, other input/output (I/O) interfaces 1626, and other computer-readable media 1628. In some embodiments, the remote server 102 may be implemented by cloud computing resources.

Processor 1622 includes one or more processing devices that execute computer instructions to perform operations (e.g., actions), including at least some embodiments described herein. In various embodiments, the processor 1622 may include one or more central processing units ("CPU"), programmable logic, or other processing circuitry.

Memory 1604 may include one or more various types of non-volatile and/or volatile storage technologies. Examples of memory 1604 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 1604 may be utilized to store information, including computer-readable instructions that are utilized by processor 1622 to perform actions, including at least some embodiments described herein.

Memory 1604 may have stored thereon multi-dimensional fabric operating system 104. The multi-dimensional fabric operating system 104 authenticates users of personal mobile computing devices 124 via display devices 108 and provides a user interface of a multi-dimensional fabric for storing and accessing content, as described herein.

Memory 1604 may include a content database 1612 for storing content in accordance with the multi-dimensional fabric user interface. Memory 1604 may also store other programs 1610. The other programs 510 may include other operating systems, user applications, or other computer programs that are accessible to the personal mobile computing device 124 via the display device 108.

Network interface 1624 is configured to communicate with other computing devices, such as the display devices 108, via a communication network 106. Network interface 1624 includes transmitters and receivers (not illustrated) to send and receive data associated with the multi-dimensional fabric user interface described herein.

Other I/O interfaces 1626 may include interfaces for various other input or output devices, such as audio interfaces, other video interfaces, USB interfaces, physical buttons, keyboards, haptic interfaces, tactile interfaces, or the like. Other computer-readable media 1628 may include other types of stationary or removable computer-readable media, such as removable flash drives, external hard drives, or the like.

The display devices 108 are computing devices that are remote from the remote server 102. In some embodiments, the display devices 108 may include one or more computing devices and display devices. The display devices 108 coordinate authentication between the personal mobile computing devices 124 and the remote server 102. The display devices 108 receive input from the users of the personal mobile computing device 124 and provide the input to the remote server 102. The display devices 108 receive the graphical user interfaces for the multi-dimensional fabric user interface to be presented to the users of the personal mobile computing devices 124.

One or more special-purpose computing systems may be used to implement the display devices 108. Accordingly, various embodiments described herein may be implemented in software, hardware, firmware, or in some combination thereof.

The display devices 108 include memory 1640, one or more processors 1650, network interface 1652, display interface 1654, and user input interface 1656. The memory 1640, processor 1650, and network interface 1652 may be similar to, include similar components, or incorporate embodiments of memory 1604, processor 1622, and network interface 1624 of remote server 102, respectively. Thus, processor 1650 includes one or more processing devices that execute computer instructions to perform operations (e.g., actions), including at least some embodiments described herein. In various embodiments, the processor 1650 may include one or more CPUs, programmable logic, or other processing circuitry. The network interfaces 1652 is also configured to communicate with the personal mobile computing devices 124, such as via Bluetooth or other short-range communication protocol or technology.

Memory 1640 may include one or more various types of non-volatile and/or volatile storage technologies. Memory 1640 may be utilized to store information, including computer-readable instructions that are utilized by processor 1650 to perform actions, including at least some embodiments described herein. Memory 1640 may store various modules or programs, including authentication module 1642 and user interface module 1644. The authentication module 1642 may perform actions that coordinate the authentication between the personal mobile computing devices 124 and the remote server 102. The user interface module 1644 receives graphical user interface data from the remote server 102 for display or presentation, via the display interface 1654, to the user of the personal mobile computing devices 124. The user interface module 1644 also receives user input via the user input interface 1656 and provides that input back to the remote server 102. In various embodiments, one or more capacitive, radar, infrared, LIDAR, or other type of gesture capturing sensors may be used to receive the user input. In some other embodiments, the user interface module 1644 may receive user inputs via other input mechanisms, such as a mouse, stylus, voice-recognition, or other input sensors. Memory 1640 may also store other programs.

The personal mobile computing devices 124 are computing devices that are remote from the display devices 108 and the remote server 102. When a personal mobile computing device 124 is within a threshold range of the display device 108 or when a user of the personal mobile computing device 124 activates authentication, the personal mobile computing device 124 provides authentication data or information to the display device 108 for forwarding to the remote server 102. In various embodiments, the personal mobile computing device 124 is separate from the display device 108, such that a user can walk up to a display device 108 with the personal mobile computing device 124 to initiate the process described herein to have the display device 108 present the user interface of the multi-dimensional fabric received from the remote server 102. The user can then provide input to the display device 108, such as with hand gestures or arm movement, to manipulate the multi-dimensional fabric user interface and select content for display.

One or more special-purpose computing systems may be used to implement the personal mobile computing devices 124. Accordingly, various embodiments described herein may be implemented in software, hardware, firmware, or in some combination thereof.

The personal mobile computing devices 124 include memory 1660, one or more processors 1664, and a network interface 1666. The memory 1660, processor 1664, and network interface 1666 may be similar to, include similar components, or incorporate embodiments of memory 1640, processor 1650, and network interfaces 1652 of display devices 108, respectively. Thus, processor 1664 includes one or more processing devices that execute computer instructions to perform operations (e.g., actions), including at least some embodiments described herein. In various embodiments, the processor 1664 may include one or more CPUs, programmable logic, or other processing circuitry. The network interface 1666 is configured to communicate with the display devices 108, but not with the remote server 102.

Memory 1660 may include one or more various types of non-volatile and/or volatile storage technologies. Memory 1660 may be utilized to store information, including computer-readable instructions that are utilized by processor 1664 to perform actions, including at least some embodiments described herein. Memory 1660 may store various modules or programs, including authentication module 1662. The authentication module 1662 may perform actions to communicate authentication information to a display device 108 when within a threshold distance from the display device or when activated by a user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. An augmented reality system, the augmented reality system comprising:
   a remote server having a server memory that stores server computer instructions and a server processor that when executing the server computer instructions causes the remote server to:
   manipulate a multi-dimensional fabric user interface for a user based on received input from the user via an associated personal mobile computing device;
   enable the user to enter a first location side of a portal and travel to a virtual representation of a second actual physical location from a virtual representation of a first actual physical location, wherein the associated personal mobile computing device is a hand-held device that uses non-image positional user input to navigate with the multi-dimensional fabric user interface;
   while in the multi-dimensional fabric user interface of a multi-dimensional fabric that virtually represents the second actual physical location, enable the user to pick up a virtual object from the virtual representation of the second actual physical location;
   enable the user to enter a second location side of the portal on the associated personal mobile computing device from the virtual representation of the second actual physical location and travel to the virtual representation of the first actual physical location with the virtual object that the user picked up in the virtual representation of the second actual physical location;
   store the virtual object at a corresponding storage location within the multi-dimensional fabric, in response to the user placing the virtual object at a specific location in the virtual representation of the first actual physical location; and
   initiate an operation relating to an actual object that corresponds to the virtual object, in response to the user picking up, transferring, and placing the virtual object at the specific location in the virtual representation of the first actual physical location.

2. The augmented reality system of claim 1, wherein the virtual object picked up, transferred, and placed by the user represents the actual object in a physical world.

3. The augmented reality system of claim 1, wherein the virtual object picked up, transferred, and placed by the user represents an actual service in a physical world.

4. The augmented reality system of claim 1, wherein the remote server, when executing the server computer instructions, further causes the remote server to:
enable the user to look through the first location side of the portal on the associated personal mobile computing device and interact with the virtual object in the virtual representation of the second actual physical location from the virtual representation of the first actual physical location.

5. The augmented reality system of claim 1, wherein the remote server, when executing the server computer instructions, further causes the remote server to:
enable the user to look through the first location side of the portal on the associated personal mobile computing device, pick up, and transfer the virtual object from the virtual representation of the second actual physical location to the virtual representation of the first actual physical location; and
initiate the operation relating to the actual object that corresponds to the virtual object, in response to the user transferring the virtual object to the virtual representation of the first actual physical location.

6. The augmented reality system of claim 1, wherein the operation initiated by the user relating to the actual object is a purchase of the actual object that corresponds to the virtual object.

7. The augmented reality system of claim 1, wherein the operation initiated by the user relating to the actual object is reserving temporary usage of the actual object that corresponds to the virtual object.

8. The augmented reality system of claim 1, wherein the operation initiated by the user relating to the actual object is one or more of uploading data and downloading data related to purchasing the actual product or an actual service.

9. The augmented reality system of claim 1, wherein the user picking up, transferring, and placing the virtual object at the specific location in the virtual representation of the first actual physical location creates a link for future information transfer.

10. The augmented reality system of claim 1, wherein the user picking up, transferring, and placing the virtual object at the specific location in the virtual representation of the first actual physical location creates a link for future purchases.

11. The augmented reality system of claim 1, wherein the manipulation of the multi-dimensional fabric user interface based on the received input from the user includes moving anchored digital content from a first location in the multi-dimensional fabric user interface to a second location in the multi-dimensional fabric user interface.

12. The augmented reality system of claim 1, wherein the manipulation of the multi-dimensional fabric user interface based on the received input from the user includes moving anchored digital content from a location in the multi-dimensional fabric user interface to a user in the multi-dimensional fabric user interface.

13. An augmented reality remote server system for enabling enhanced functionality in an environment, the augmented reality remote server system comprising:
a server processor;
server memory that stores server computer instructions, wherein the server processor, when executing the server computer instructions, causes a remote server to:
manipulate and display a multi-dimensional fabric user interface of a multi-dimensional fabric based on received input from a user via an associated personal mobile computing device;
enable a user to travel to a virtual representation of a second actual physical location in the multi-dimensional fabric user interface from a virtual representation of a first actual physical location in the multi-dimensional fabric user interface, wherein the associated personal mobile computing device uses non-image positional user input to navigate with the multi-dimensional fabric user interface;
while in the multi-dimensional fabric user interface that virtually represents the second actual physical location, enable the user to pick up virtual content from the virtual representation of the second actual physical location;
enable the user to travel to the virtual representation of the first actual physical location with the virtual content that the user picked up in the virtual representation of the second actual physical location;
store the virtual content at a corresponding storage location within the multi-dimensional fabric, in response to the user placing the virtual content at a specific location in the virtual representation of the first actual physical location; and
initiate an operation relating to an actual object that corresponds to the virtual content, in response to the user picking up, transferring, and placing the virtual content at the specific location in the virtual representation of the first actual physical location.

14. The augmented reality remote server system of claim 13, wherein the virtual content picked up, transferred, and placed by the user represents one or more of the actual object in a physical world or an actual service in the physical world.

15. An augmented reality method for enabling enhanced functionality in an environment, the augmented reality method comprising:
providing a multi-dimensional fabric user interface to an associated personal mobile computing device that is a virtual representation of a first actual physical location;
manipulating the multi-dimensional fabric user interface based on received input from the user via the associated personal mobile computing device, wherein the associated personal mobile computing device uses non-image positional user input to navigate with the multi-dimensional fabric user interface;
enabling a user to enter a first location side of a portal and travel to a virtual representation of a second actual physical location in the multi-dimensional fabric user interface from the virtual representation of the first actual physical location in the multi-dimensional fabric user interface;
while in the multi-dimensional fabric user interface that virtually represents the second actual physical location, enabling the user to pick up one or more of virtual objects and virtual content from the virtual representation of the second actual physical location;
enabling the user to enter a second location side of the portal on the associated personal mobile computing device from the virtual representation of the second actual physical location and travel to the virtual representation of the first actual physical location with the one or more of the virtual objects and the virtual content that the user picked up in the virtual representation of the second actual physical location;

enabling the user to place the one or more of the virtual objects and the virtual content at a specific location in the virtual representation of the first actual physical location; and initiating an operation relating to an actual object that corresponds to the one or more of the virtual objects and the virtual content, in response to the user picking up, transferring, and placing the one or more of the virtual objects and the virtual content at the specific location in the virtual representation of the first actual physical location.

16. The augmented reality method of claim 15, wherein the one or more of the virtual objects and the virtual content picked up, transferred, and placed by the user represent one or more of the actual object in a physical world or an actual service in the physical world.

17. The augmented reality method of claim 15, further comprising:

enabling the user to look through the first location side of the portal on the associated personal mobile computing device, pick up, and transfer the one or more of the virtual objects and the virtual content from the virtual representation of the second actual physical location to the virtual representation of the first actual physical location; and initiating the operation relating to the actual object that corresponds to the one or more of the virtual objects and the virtual content, in response to the user transferring the one or more of the virtual objects and the virtual content to the virtual representation of the first actual physical location.

18. The augmented reality method of claim 15, wherein the operation initiated by the user relating to the actual object is a purchase of the actual object.

19. The augmented reality method of claim 15, wherein the operation initiated by the user relating to the actual object is reserving temporary usage of the actual object.

20. The augmented reality method of claim 15, wherein the manipulation of the multi-dimensional fabric user interface based on the received input from the user includes moving anchored digital content from a first location in the multi-dimensional fabric user interface to a second location in the multi-dimensional fabric user interface.

21. An augmented reality remote server system for enabling enhanced functionality in an environment, the augmented reality remote server system comprising:

a server processor;

a server memory that stores server computer instructions, the server processor when executing the server computer instructions causing a remote server to:

manipulate and display a multi-dimensional fabric user interface of a multi-dimensional fabric based on received input from a user via an associated personal mobile computing device;

enable the user to travel to a virtual representation of a second actual physical location at a second date and time in the multi-dimensional fabric user interface from a virtual representation of a first actual physical location at a first date and time;

while in the multi-dimensional fabric user interface that virtually represents the second actual physical location, enable the user to pick up one or more of virtual objects and virtual content from the virtual representation of the second actual physical location at the second date and time;

enable the user to travel to the virtual representation of the first actual physical location at the first date and time with the one or more of the virtual objects and the virtual content that the user picked up in the virtual representation of the second actual physical location at the second date and time;

store the one or more of the virtual objects and the virtual content at a corresponding storage location within the multi-dimensional fabric, in response to the user placing the one or more of the virtual objects and the virtual content at a specific location in the virtual representation of the first actual physical location; and initiate an operation relating to an actual object that corresponds to the one or more of the virtual objects and the virtual content, in response to the user picking up, transferring, and placing the one or more of the virtual objects and the virtual content at the specific location in the virtual representation of the first actual physical location.

* * * * *